(12) United States Patent
Naiki et al.

(10) Patent No.: US 9,686,388 B2
(45) Date of Patent: Jun. 20, 2017

(54) PROJECTOR

(75) Inventors: Takashi Naiki, Kyoto (JP); Masahide Tanaka, Toyonaka (JP)

(73) Assignee: Rohm Co., Ltd., Kyoto (JP)

( * ) Notice: Subject to any disclaimer, the term of this patent is extended or adjusted under 35 U.S.C. 154(b) by 436 days.

(21) Appl. No.: 14/115,385

(22) PCT Filed: May 11, 2012

(86) PCT No.: PCT/JP2012/062107
§ 371 (c)(1),
(2), (4) Date: Nov. 4, 2013

(87) PCT Pub. No.: WO2012/157546
PCT Pub. Date: Nov. 22, 2012

(65) Prior Publication Data
US 2014/0066127 A1    Mar. 6, 2014

(30) Foreign Application Priority Data

May 13, 2011  (JP) ................................. 2011-108390
Jul. 26, 2011  (JP) ................................. 2011-163387
Apr. 23, 2012  (JP) ................................. 2012-097363

(51) Int. Cl.
*H04M 1/00*       (2006.01)
*H04M 1/02*       (2006.01)
(Continued)

(52) U.S. Cl.
CPC ............ *H04M 1/0272* (2013.01); *G03B 5/00* (2013.01); *G03B 21/142* (2013.01);
(Continued)

(58) Field of Classification Search
CPC ..... H04M 1/0272; G03B 21/147; G03B 5/00; G03B 21/142; G03B 2205/003;
(Continued)

(56) References Cited

U.S. PATENT DOCUMENTS 6,185,045 B1 *  2/2001  Hanano .............. G02B 27/0172
                                                        359/630
6,807,022 B1 * 10/2004  Yanowitz ........... G02B 26/0875
                                                        359/819
(Continued)

FOREIGN PATENT DOCUMENTS

JP       11-183951        7/1999
JP     2003-283963       10/2003
(Continued)

OTHER PUBLICATIONS

Japanese Patent Office, International Search Report for PCT/JP2012/062107 with English translation (Aug. 14, 2012).
(Continued)

*Primary Examiner* — Amancio Gonzalez
(74) *Attorney, Agent, or Firm* — Fish & Richardson P.C.

(57) ABSTRACT

The present disclosure describes a projector which has: an image projection portion; an image provision portion that provides a projection image to the image projection portion; a deviation movement detection portion that detects a deviation movement of the image projection portion; and an image process portion that based on detection by the deviation movement detection portion, shifts the image provided by the image provision portion in a direction where the deviation movement is corrected. According to this, even if an image projection function does not include a deviation correction function, it is possible to perform the deviation correction by means of the image process.

3 Claims, 18 Drawing Sheets

(51) Int. Cl.
  *H04N 9/31* (2006.01)
  *G03B 5/00* (2006.01)
  *G03B 21/14* (2006.01)
  *G09G 3/00* (2006.01)

(52) U.S. Cl.
  CPC ......... *G03B 21/147* (2013.01); *H04N 9/3173* (2013.01); *H04N 9/3185* (2013.01); *G03B 2205/003* (2013.01); *G03B 2205/0061* (2013.01); *G09G 3/002* (2013.01); *G09G 2340/0464* (2013.01)

(58) Field of Classification Search
  CPC ......... G03B 2205/0061; H04N 9/3173; H04N 9/3185; G09G 2340/0464; G09G 3/002
  USPC ...................................................... 455/556.1
  See application file for complete search history.

(56) References Cited

U.S. PATENT DOCUMENTS

| | | | |
|---|---|---|---|
| 7,083,287 B2* | 8/2006 | Pate | G03B 21/2046 348/745 |
| 2003/0223048 A1 | 12/2003 | Kimura | |
| 2004/0041985 A1 | 3/2004 | Kimura et al. | |
| 2004/0114040 A1* | 6/2004 | Bellwood | H04N 3/20 348/173 |
| 2005/0099607 A1 | 5/2005 | Yokote et al. | |
| 2005/0280605 A1* | 12/2005 | Tsao | G02B 27/2285 345/32 |
| 2006/0077272 A1 | 4/2006 | Yamada et al. | |
| 2006/0159365 A1* | 7/2006 | Chang | G03B 21/10 382/275 |
| 2007/0249396 A1 | 10/2007 | Nitta et al. | |
| 2011/0102609 A1 | 5/2011 | Iwata | |
| 2011/0304833 A1 | 12/2011 | Osaka et al. | |
| 2011/0306388 A1 | 12/2011 | Osaka et al. | |
| 2012/0307715 A1 | 12/2012 | Maeda et al. | |

FOREIGN PATENT DOCUMENTS

| | | |
|---|---|---|
| JP | 2004-77545 | 3/2004 |
| JP | 2005-128506 | 5/2005 |
| JP | 2005-189733 | 7/2005 |
| JP | 2009-81616 | 4/2009 |
| JP | 2009-186646 | 8/2009 |
| JP | 2009-267873 | 11/2009 |
| JP | 2010-28412 | 2/2010 |
| JP | 2010-50838 | 3/2010 |
| JP | 2010-102064 | 5/2010 |
| JP | 2010-226699 | 10/2010 |
| WO | 98/00685 | 1/1998 |
| WO | 2006/033245 | 3/2006 |
| WO | 2006/080278 | 8/2006 |

OTHER PUBLICATIONS

European Search Report in patent application No. 12830113.2 (mailed on Jun. 3, 2015).

* cited by examiner

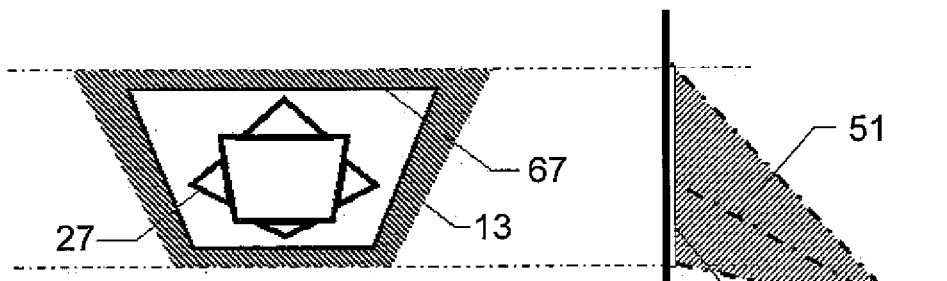
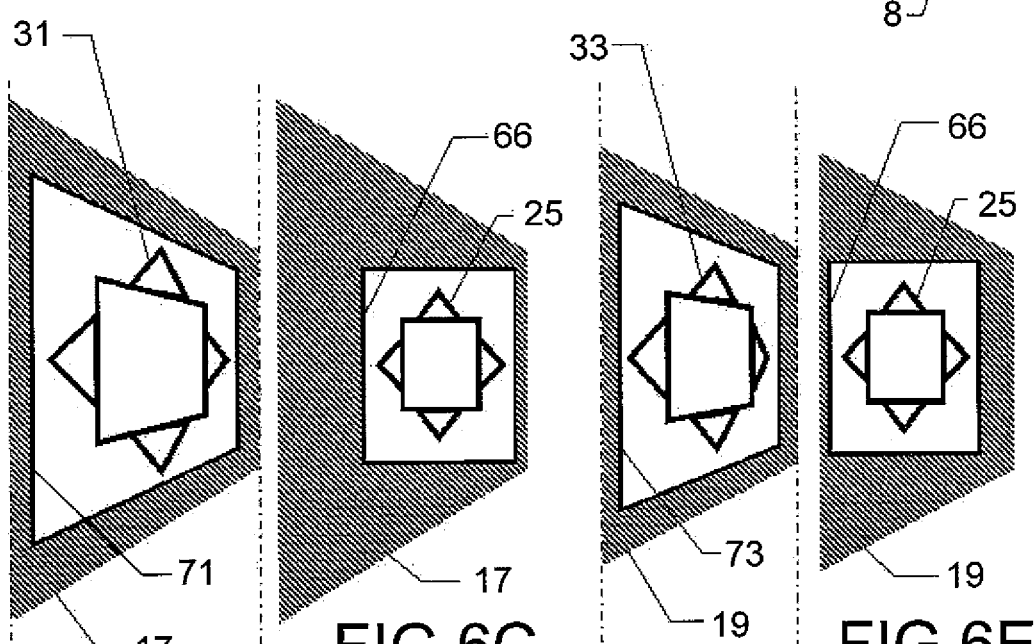
FIG.6A
FIG.6C
FIG.6E
FIG.6B
FIG.6D

PROJECTOR

TECHNICAL FIELD

The present invention relates to a projector.

BACKGROUND ART

Conventionally, various projectors are suggested for various purposes. For example, it is suggested that an image projection portion is disposed in a mobile telephone and light emission from the projection portion is stopped when a change occurs in a predetermined region including a region onto which the light emitted from the projection portion is projected, and suggested that an acceleration sensor is disposed and a hand shaking correction is performed if a hand shaking vibration is detected (patent document 1). Besides, it is also suggested that in a hand-held projector, a vertex of a variable vertex prism is changed by an electromagnetic actuator based on a hand shaking detection signal from a sensor to prevent a projected image from being shaken by a hand (patent document 2).

Besides, as to hand shaking correction control, although not for a projector, but for a digital camera that incorporates an optical hand shaking correction function, it is suggested that in a case where a user intentionally performs a panning operation or a tilting operation, the hand shaking correction function is prohibited from working, and the hand shaking correction function is resumed by determining, with high accuracy, an end of a panning state or a tilting state (patent document 3). Further, as to a projector, it is suggested that a trapezoidal distortion correction of an image projected slantingly is performed by detecting a set angle of the projector (patent document 4). In the meantime, as to the trapezoidal distortion correction, it is also suggested that an upper side and a lower side of image data are exchanged with each other and the correction is performed by determining whether the projection screen is shifted from a wall surface to a ceiling or not, or shifted from a wall surface to a wall surface or not (patent document 5).

CITATION LIST

Patent Literature

PLT1: JP-A-2010-226699
PLT2: JP-A-2005-128506
PLT3: JP-A-2009-267873
PLT4: JP-A-2003-283963
PLT5: JP-A-2004-77545

SUMMARY OF INVENTION

Technical Problem

But, as to a projector, there are many problems to be studied.

In light of the above description, it is an object of the present invention to provide a projector that is easier to use.

Solution to Problem

To achieve the above object, the present invention provides a projector which has: an image projection portion; an image provision portion that provides a projection image to the image projection portion; a deviation movement detection portion that detects a deviation movement of the image projection portion; and an image process portion that based on detection by the deviation movement detection portion, shifts the image provided by the image provision portion in a direction where the deviation movement is corrected. According to this, even if an image projection function does not include a deviation correction function, it is possible to perform the deviation correction by means of the image process.

According to a specific feature of the present invention, based on the detection by the deviation movement detection portion, the image process portion further corrects a projection frame for the projection image provided by the image provision portion. According to this, it becomes possible to deal with flickering of the projection image during the deviation correction as an image process.

According to a more specific feature, based on the detection by the deviation movement detection portion, the image process portion shifts the projection frame for the projection image provided by the image provision portion. According to this, it becomes possible to apply the deviation correction to both the image and the image frame.

According to another more specific feature, based on the detection by the deviation movement detection portion, the image process portion shrinks, in a projection area, the projection frame for the projection image provided by the image provision portion. According to this, a correction area for the projection frame is secured. According to a further specific feature, based on the detection by the deviation movement detection portion, the image process portion shrinks, in the shrunken projection frame, the projection image provided by the image provision portion. According to this, it becomes possible to apply the deviation correction to both the image and the image frame without losing a circumferential portion of the projection image.

According to another more specific feature, when the projection frame shrunken based on the detection by the deviation movement detection portion is not shiftable in the projection area, the image process portion decreases a shift amount of the image provided by the image provision portion. According to this, the deviation correction of the image and image frame is adjusted.

According to another specific feature of the present invention, the image process portion is structured to blur the projection frame for the projection image provided by the image provision portion. According to this, a boundary between a bright portion in the projection area and a dark portion outside the projection area becomes inconspicuous, and it becomes possible to deal with flickering of the projection image frame during the deviation correction as an image process.

According to another aspect of the present invention, a projector is provided which has: an image projection portion; an image provision portion that provides a projection image to the image projection portion; and an image process portion that blurs a projection frame for the projection image provided by the image provision portion. According to this, it becomes possible to make inconspicuous a boundary which has the largest difference between brightness and darkness and is between a bright portion in the projection area and a dark portion outside the projection area. According to a more specific feature, the projector has a deviation movement detection portion that detects a deviation movement of the image projection portion, wherein based on detection by the deviation movement detection portion, the image process portion blurs the projection frame for the projection image provided by the image provision portion. According to this, it is possible to prevent a circumferential portion of the projection image from unnecessarily becoming blurred when there is a little flickering. According to a further specific feature, based on the detection by the deviation movement detection portion, the image process portion changes a blurring amount of the projection frame for the projection image provided by the image provision portion. According to this, it becomes possible to perform a suitable blurring adjustment in accordance with the deviation.

According to another aspect of the present invention, a projector is provided which has: a rectangular image display portion; an image projection portion that is disposed such that a projection optical axis meets a long-edge direction of the image display portion at right angles; and an image provision portion that provides a projection image to the image projection portion. According to this, when a horizontally long projection screen is projected, it becomes possible to display the projection image largest by means of the image display portion and monitor the projection image.

According to a more specific feature, the image projection portion is disposed at a central portion in the long-edge direction of the image display portion. According to this, when holding the projector with both hands, it becomes possible to hold the projector in a stable attitude where it is easy to operate and easy to decide a projection position.

According to another aspect of the present invention, a projector is provided which has: an image projection portion; an image provision portion that provides a projection image to the image projection portion; an attitude detection portion; and a control portion that prohibits projection performed by the image projection portion when the attitude detection portion detects an unsuitable image projection attitude. According to this, when the projection is not supposed to be performed, it is possible to prevent trouble to a surrounding area such as a start of projection of glaring projection light due to an erroneous operation and the like, which is useful, for example, for incorporating the projector into apparatuses such as a mobile telephone and the like that have originally a different function. According to a specific feature, when the attitude detection portion detects a projection attitude where a tilt of the projection image with respect to a horizontal direction is equal to or larger than a predetermined tilt, the control portion regards the projection attitude as an attitude where the projection is not supposed to be performed and prohibits the projection performed by the image projection portion. According to another specific feature, the projector is provided with a menu display portion that displays a function optional menu which includes a projection function, wherein the control portion is structured to make it disable to select the projection function from the function optional menu when the attitude detection portion detects an unsuitable projection attitude.

Advantageous Effects of Invention

As described above, according to this invention, it is possible to provide a useful projector that is easy to use.

BRIEF DESCRIPTION OF DRAWINGS

FIG. 6 is a projection screen view and a corresponding schematic sectional view of a projection light path for describing measures against a change in a projection screen during a hand shaking correction in a case where a trapezoidal distortion correction is performed in the example 1.

DESCRIPTION OF EMBODIMENTS

Example 1

Figure 1:
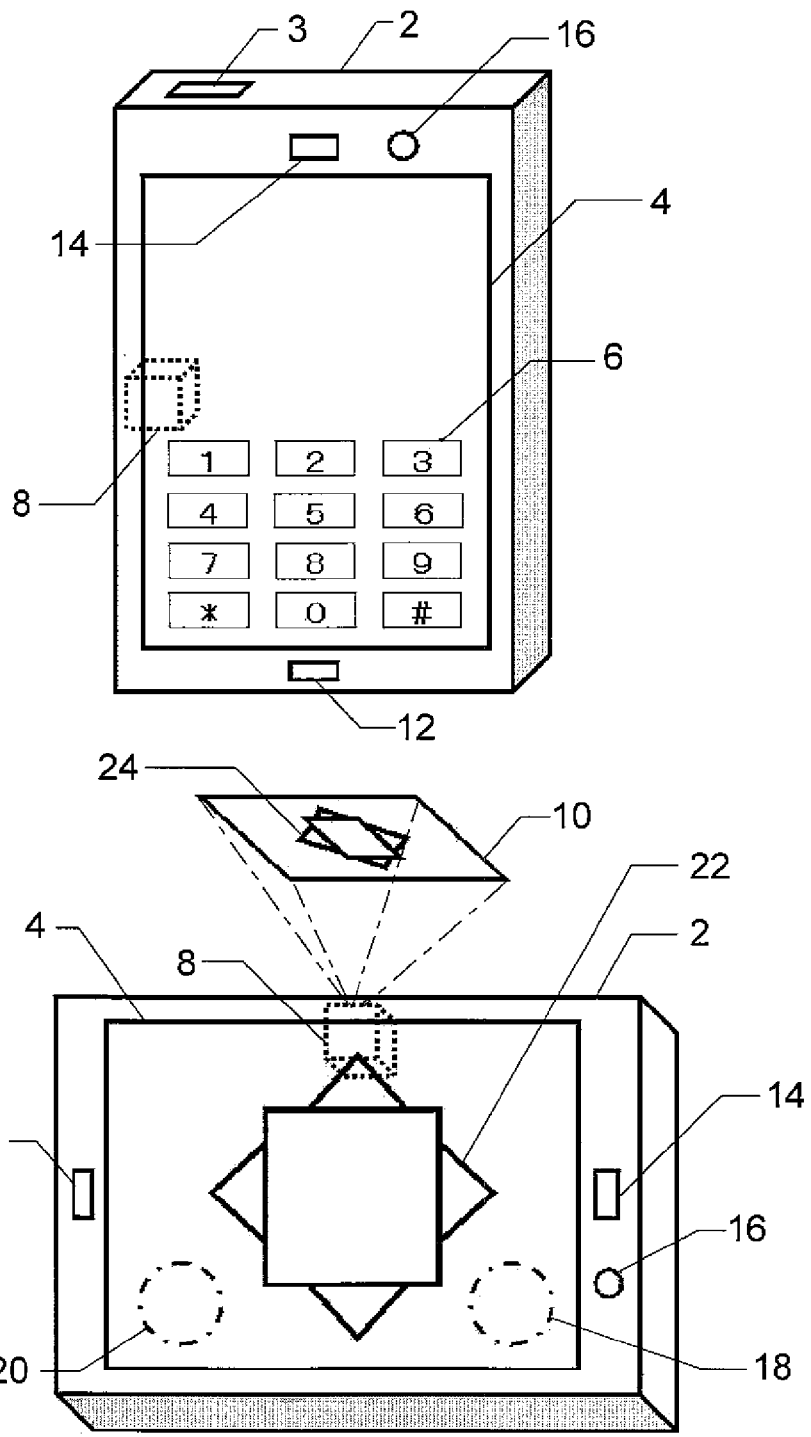
FIG. 1 is a perspective view showing an example 1 of a mobile telephone with a projector according to an embodiment of the present invention (example 1).

FIG. 1 is a perspective view showing an example 1 of a mobile telephone with a projector according to an embodiment of the present invention. FIG. 1(A) shows a case where a mobile telephone 2 with a projector is vertically held and a general operation for a dialog and the like is performed by means of a ten-key pad 6 and the like displayed on a large screen display portion 4. On the other hand, FIG. 1(B) shows a case where the mobile telephone 2 with the projector is held horizontally by both hands and a projection screen 10 is projected on a wall and the like from a projector portion 8. In the meantime, in FIG. 1(A) and FIG. 1(B), to avoid double description, the same portions are indicated by the same numbers.

Hereinafter, FIG. 1 is described in detail. As shown in FIG. 1(A), the mobile telephone 2 with the projector is structured as a so-called smart phone that has a large screen display portion 4 which is able to display a photograph, a web site screen and the like. And, the large screen display portion 4 doubles as a touch panel, and permits a GUI (graphical user interface) for touching or sliding, with a finger, an operation screen that includes various operation portions such as a ten-key pad 6 and the like that are displayed. In the meantime, an operation portion 3 is a mechanical operation portion for performing the turning on/off of a main power supply and the like. Besides, the mobile telephone 2 with the projector is provided with a microphone 12 that captures a sound released from the mouth of an operator and a speaker 14 that transmits a sound to an ear of the operator. Further, in a case where the mobile telephone 2 with the projector is used as a television telephone, an internal camera 16 is disposed which is able to capture an image of the operator watching the large screen display portion 4 and used to capture a self-photo of the operator as well. In the meantime, although not shown in FIG. 1, a rear side of the mobile telephone 2 with the projector is provided with a rear side main camera, so that it is possible to capture an image of an object monitored by means of the large screen display portion 4.

A micro-miniature projector portion 8 is incorporated in a left side portion of the mobile telephone 2 with the projector in FIG. 1(A), and its optical axis faces the left side of FIG. 1(A). As described later, the mobile telephone 2 with the projector is provided with a three-axis acceleration sensor, so that it is possible to detect an attitude of the mobile telephone 2 with the projector by detecting a gravity acceleration direction. And, in a case of a tilt attitude where the speaker 14 exceeds a predetermined angle to be situated above the microphone 12 in an operation state, a dialog state and the like in a vertical posture as shown in FIG. 1(A), it is determined not to be a situation where projection by the micro-miniature projector portion 8 is performed, and even if an erroneous projection operation is performed, the projection is prohibited. This means to prevent an erroneous operation that gives trouble to the surrounding area and to avoid unnecessary power consumption.

On the other hand, in a projection attitude of FIG. 1(B), the mobile telephone 2 with the projector is horizontally held; therefore, it is detected by the acceleration sensor that the speaker 14 and the microphone 12 are in an attitude substantially close to a horizontal line, and a projector mode operation for projecting a projection screen 10 from the projector portion 8 onto a wall and the like is permitted. At this time, there is also a case where the projection screen 10 is projected upward onto a ceiling, a wall and the like or downward onto a floor, a wall and the like; therefore, as to a back and forth direction of the horizontally held state in FIG. 1(B), even if the projection optical axis extends in any direction having an angle of 0° to 360° around a pseudo-line that connects the speaker 14 and the microphone 12 to each other, the projector mode operation is permitted.

In the meantime, as described above, as long as it is detected by the acceleration sensor that the mobile telephone 2 with the projector is vertically held, the projector mode is erased from options on a menu screen displayed on the large screen display portion 4 and prohibited; but if the horizontally held state is detected, the projector mode is added to the options on the menu screen and the selection is permitted. If the projector mode is selected, a right thumb operation portion 18 and a left thumb operation portion 20 are displayed on the large screen display portion 4, so that it becomes possible to perform selecting, enlarging, shrinking, scrolling and the like of a projection screen by means of a combination of a touch operation and a slide operation by both thumbs at these portions. Besides, thanks to the operation at these portions, a correction stop operation described later is also possible. The operation by both thumbs in the horizontally held state is suitable for a game screen operation and the like. Besides, in the projector mode, projection content 22 is displayed on the large screen display portion 4 in the horizontally held state, and the same projection content 24 is projected in the horizontally long projection screen 10. Accordingly, in a case where the example 1 is used for presentation, it becomes possible to perform description or operation of the projection screen 10 monitoring the largest horizontally long image possible by the large screen display portion 4.

Figure 2:
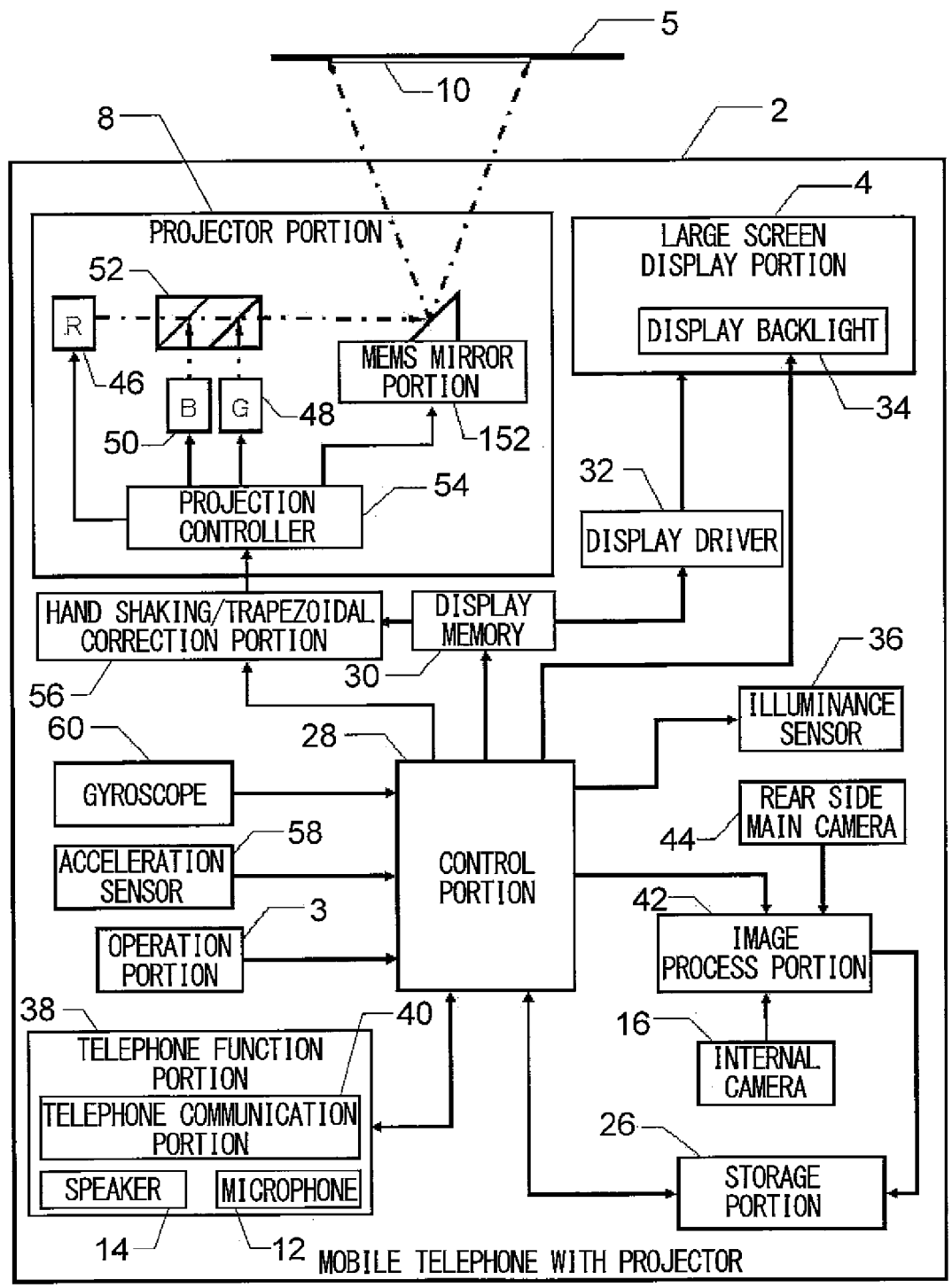
FIG. 2 is a block diagram of the example 1.

FIG. 2 is a block diagram of the example 1, in which the same portions are indicated by the same numbers, and the description is skipped as long as it is not necessary. The mobile telephone 2 with the projector is controlled by a control portion 28 that operates in accordance with a program stored in a storage portion 26. Also, the storage portion 26 is able to temporarily store data necessary for the control by the control portion 28 and to store various measurement data and images as well. A display driver 32 performs the display on the large screen display portion 4 based on display data held by a display memory 30. The display driver 32 is controlled by the control portion 28. The large screen display portion 4 has a display backlight 34, and the control portion 28 automatically adjusts brightness of the display backlight 34 based on surrounding brightness detected by an illuminance sensor 36.

A telephone function portion 38 including the microphone 12 and the speaker 14 is connectable to a wireless telephone line by a telephone communication portion 40 under the control by the control portion 28. The speaker 14, under sound volume control by the control portion 28, releases an incoming sound as well as a dialog, performs varieties of guidance, and outputs a voice of the person of the other end of the line during a dialog over a television telephone. In the meantime, to output a sound other than the sound heard with the speaker 14 applied to an ear, an additional dedicated speaker may be disposed. An image process portion 42 is controlled by the control portion 28, thereby processing images captured by the internal camera 16 and rear side main camera 44 and inputting images as a result of the processing into the storage portion 26.

The projector portion 8 uses a light source that includes a red laser diode 46, a green laser diode 48 and a blue laser diode 50, synthesizes the respective R, G, and B laser light from the laser diodes by means of a synthetic prism 52, and makes a MEMS (Micro Electro Mechanical Systems) mirror portion 152 perform a scan to project the projection screen 10 onto a wall 5 and the like, and composes a micro-miniature projector engine that has no projection lens. And, a projection controller 54, based on input display data, performs synchronized control of the respective light intensities emitted from the red laser diode 46, the green laser diode 48 and the blue laser diode 50 and of the scan by the MEMS mirror portion 152, thereby producing the projection screen 10.

The display data are input into the projector portion 8 from the display memory 30 via a hand shaking/trapezoidal correction portion 56. The hand shaking/trapezoidal correction portion 56 is able to perform an image process based on the display data at a speed compatible with a scan rate (a vertical scan rate in a horizontal scan direction) for changing a screen projected from the projector portion 8 so as to produce a hand shaking correction image in units of possible change screen. The control portion 28 controls an image correction process in the hand shaking/trapezoidal correction portion 56 based on a hand shaking detection by an acceleration sensor 58 having three axes of X, Y, and Z and a gyroscope 60 having three axes of X, Y, and Z. As a result of this, even if the display data held by the display memory 30 do not change, display data, which are corrected based on the hand shaking detection, are output from the hand shaking/trapezoidal correction portion 56 in units of possible change screen. In this way, even if the projector portion 8 itself does not have an optical hand shaking correction system, the hand shaking correction is performed by means of an electronic image process. In the meantime, in a case where the scan rate is high for a hand shaking frequency, a structure may be employed, in which instead of producing a hand shaking correction screen for each change screen, one correction screen is produced for several change screens. In the meantime, in a case where the hand shaking is not detected, the production of the correction screen is skipped, and the previous screen is used as long as the display data do not change.

Figure 3A:
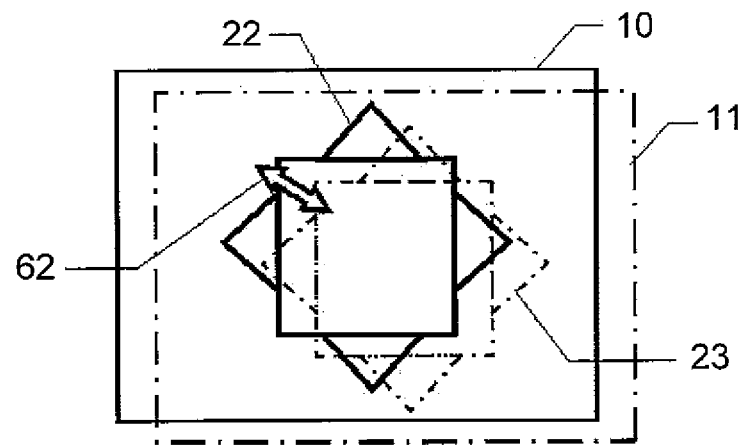
FIG. 3 is a projection screen view for describing a principle of a hand shaking correction in the example 1.

FIG. 3 is a projection screen view for describing a principle of the hand shaking correction in the example 1. In the meantime, in the following description, the same portions as FIG. 1 and FIG. 2 are indicated by the same numbers, and the description is skipped as long as it is not necessary. FIG. 3(A) shows a state where a correction is not performed even if hand shaking occurs, that is, a state where the projection screen 10 and the projection content 22 in the projection screen 10 move to a projection screen 11 and projection content 23 because a hand holding the mobile telephone 2 with the projector deviates in a lower right direction. And, considering a model in which such deviation reciprocation is repeated, as indicated by an arrow 62, the projection content deviates between the position 22 and the position 23, and likewise, the projection screen also deviates between the position 10 and the position 11.

Figure 3B:
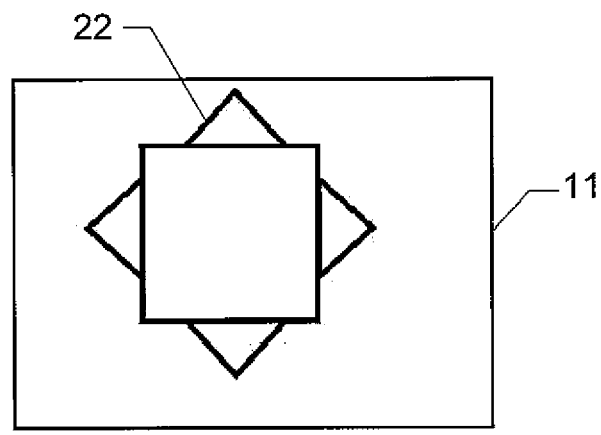
Figure 3C:
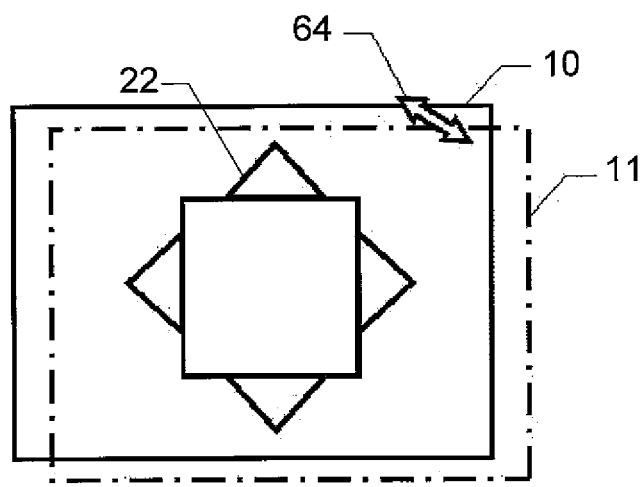

On the other hand, FIG. 3(B) shows a state where when the projection content 22 deviates to a right lower position as the projection content 23, the projection content 23 in the projection screen 11 is shifted in a left upper direction opposite to the deviation; a result of this, the projection content is held at the position 22. And, next, when deviation to a left upper position occurs because of the deviation reciprocation, the projection content is shifted in an opposite right lower direction to return the projection content to the position of the projection content 22 in FIG. 3(A). According to this, the projection content 22 stays at the same position on the wall even if the deviation reciprocation occurs. FIG. 3(C) shows a state where a shift correction of the projection content is performed by means of the image process as described in FIG. 3 (B) when the hand shaking reciprocation in the model of FIG. 3(A) occurs, and as described above, the projection content 22 stays at the same position on the wall even if the deviation reciprocation occurs. As described above, even if the projector portion 8 itself does not have an optical hand shaking correction system, it is possible to perform electronically the hand shaking correction in the projector by means of the simple image process called an image shift.

But, in the case of the correction in FIG. 3, as is clear from FIG. 3(C), the deviation of the projection content is corrected, but as to the projection screen, deviation occurs between the position 10 and the position 11 indicated by an arrow 64. Generally, a wall and the like where the projection is performed is dark and the projection screen 10 is bright; therefore, if such deviation of the projection screen 10 occurs, a boundary of the frame of the projection screen 10, where a dark area and a bright area are clearly discerned from each other, deviates, and a central portion of interest of a view field does not deviate, but an area around the view field is likely to flicker and give an annoying feeling.

Figure 4A:
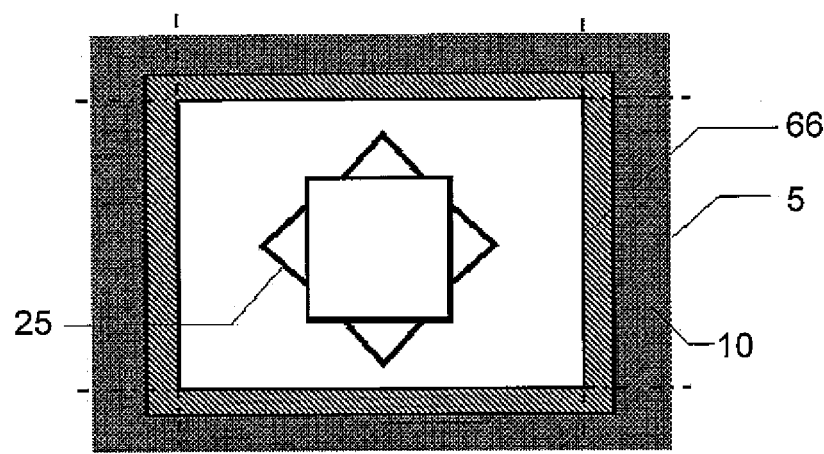
FIG. 4 is a projection screen view for describing details of a hand shaking correction of a projection screen frame in the example 1.

The example 1 further solves such a point as well. FIG. 4 is a projection screen view for describing details of a hand shaking correction of the frame of such a projection screen frame. The same portions as FIG. 1 to FIG. 3 are indicated by the same numbers, and the description is skipped as long as it is not necessary. In the example 1, as shown in FIG. 4(A), a correction projection screen 66 is set slightly inside the frame of the projection screen 10, and the outside of the correction projection screen 66 is made black to form a region that has a small difference from the wall 5 between brightness and darkness. And, the projection content 22 is slightly shrunken such that a relationship between the correction projection screen 66 and the shrunken projection content 25 becomes similar to a relationship between the projection screen 10 and projection content 22 of FIG. 3(A).

Figure 4B:
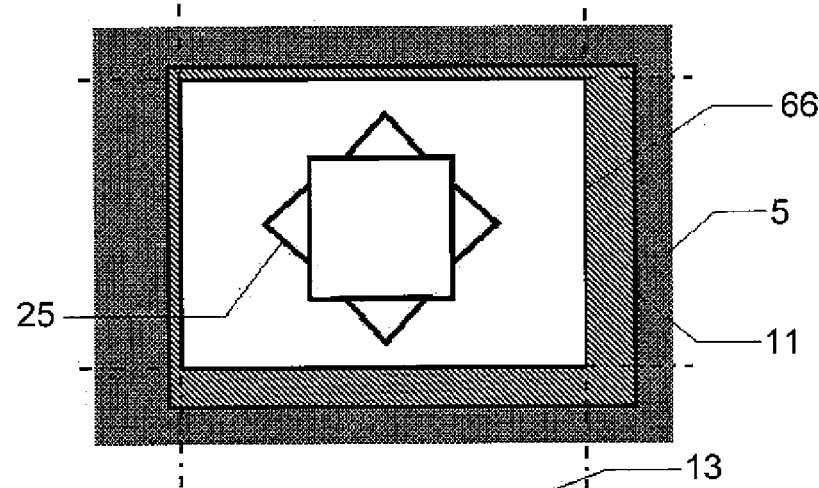

FIG. 4(B) shows a state where when the projection screen 10 deviates to a right lower position because of hand shaking to move to a state of the projection screen 11, the projection content in the projection screen 11 is shifted in a left upper direction opposite to the deviation by means of an image process and held at the position of the projection content 25. This state seems to be the same as FIG. 3(B); but, FIG. 4(B) shows a state where further, also, the correction projection screen 66 is shifted by means of the image process in the left upper direction opposite to the deviation in the projection screen 11 and held at the same position as the position of the correction projection screen 66 in FIG. 4(A). According to this, it becomes possible to apply the deviation correction not only to the projection content 25 but also to the correction projection screen 66.

Figure 4C:
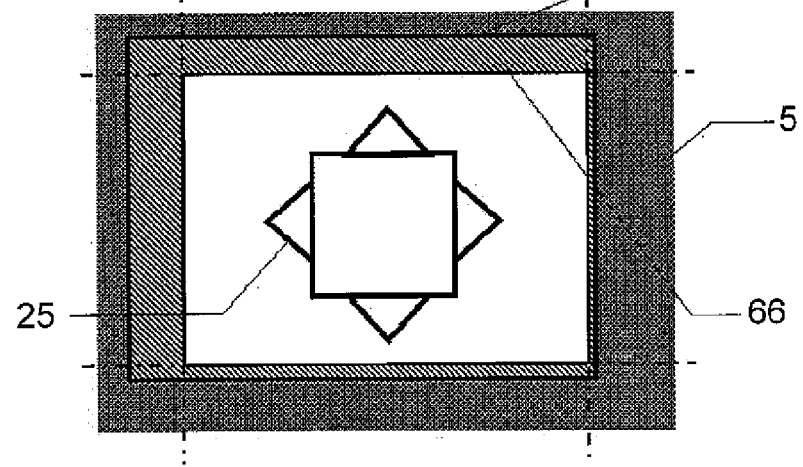

To the contrary to FIG. 4(B), FIG. 4(C) shows a state where when the projection screen 10 deviates to a left upper position from FIG. 4(A) used as a reference because of hand shaking to move to a state of a projection screen 13, the projection content in the projection screen 13 is shifted in a right lower direction opposite to the deviation by means of the image process and held at the position of the projection content 25. Further, also, the correction projection screen 66 is shifted in the right lower direction in the projection screen 13 by means of the image process and held at the same position as the position of the correction projection screen 66 in FIG. 4(A).

As described above, the example 1 uses an area where the correction projection screen 66 is shiftable in the projection screen 10, and performs the image process such that both the correction content and the correction projection screen make a parallel movement in the direction opposite to the deviation of the projection screen; and even if the deviation reciprocation occurs between FIG. 4(B) and FIG. 4(C), the projection content 25 and the correction projection screen 66 stay at the same positions on the wall 5. As described above, in the example 1, even if the projector portion 8 itself does not have an optical hand shaking correction system, it is possible to perform electronically the hand shaking correction in the projector by means of the image shift which is a simple image process, and it is also possible to prevent the flickering of the frame portion of the projection screen.

FIG. 5 is a projection screen view for describing the hand shaking correction in a case where a trapezoidal distortion correction is performed in the example 1 and a corresponding schematic sectional view of a projection light path. In the meantime, also in FIG. 5, the same portions as FIG. 1 to FIG. 4 are indicated by the same numbers, and the description is skipped as long as it is not necessary. A projection screen view of FIG. 5(A) is the same as FIG. 4(A); but the wall 5 is not shown to avoid complicatedness. Besides, a schematic sectional view of a light path corresponding to this state is shown to the right of the projection screen view of FIG. 5(A). In the meantime, the schematic sectional view of a light path should show a direction of the mobile telephone 2 with the projector with respect to the wall 5; but, for the sake of understanding, portions other than the projector portion 8 important for the projection are not shown. As is clear from the illustration, FIG. 5(A) shows a case where the projection is performed from a front side in a projection state where a projection optical axis 51 of the projector portion 8 is perpendicular to the wall 5.

Figure 5A:
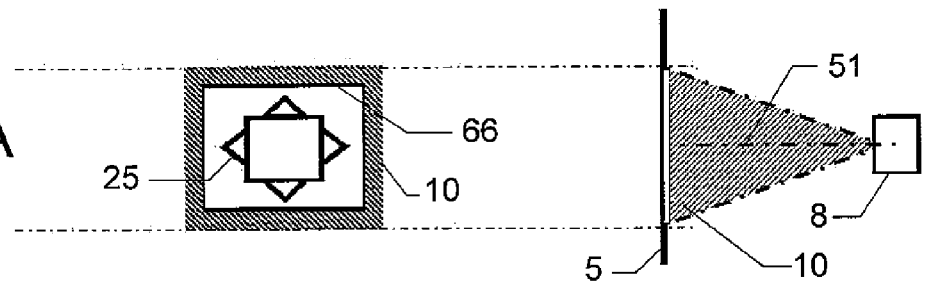
FIG. 5 is a projection screen view and corresponding schematic sectional view of a projection light path for describing a hand shaking correction in a case where a trapezoidal distortion correction is performed in the example 1.
Figure 5B:
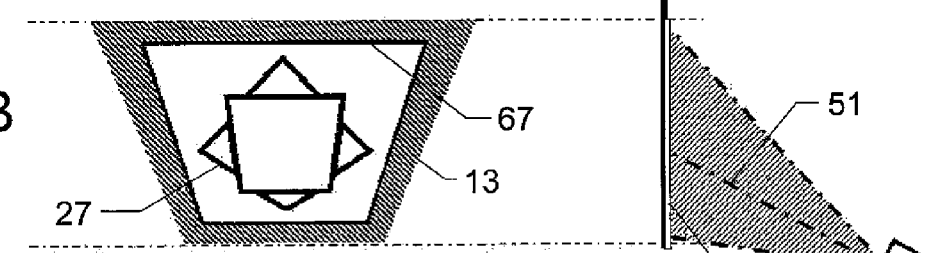
Figure 5C:
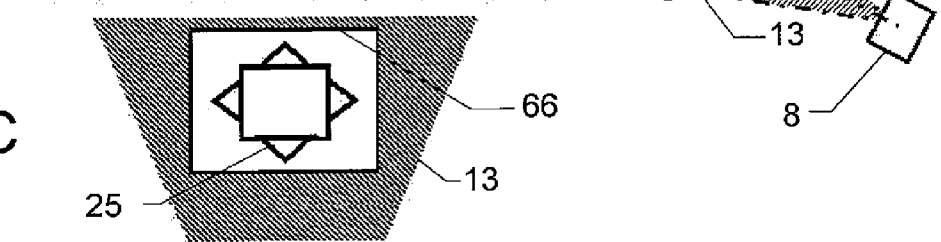
Figure 5D:
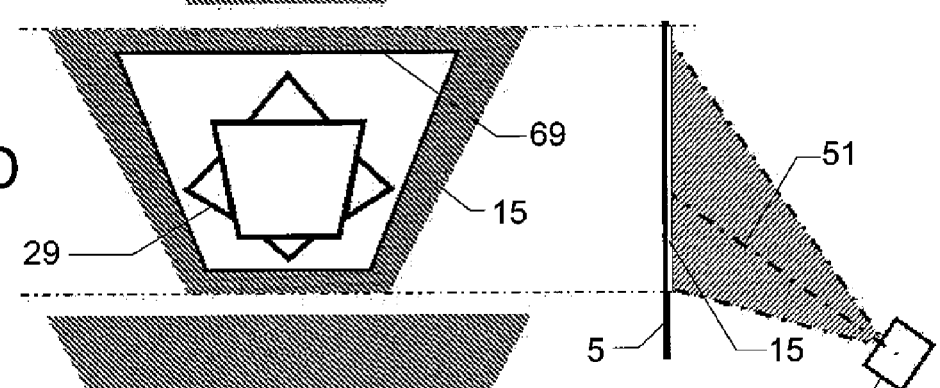

On the other hand, FIG. 5(B) to FIG. 5(E) show a hand shaking correction in a case where a trapezoidal distortion correction is performed in a projection state where the projection optical axis 51 is tilted upward with respect to the wall 5, and are used for describing a model in which hand shaking occurs between the state of FIG. 5(B) and the state of FIG. 5(D). FIG. 5(B) shows a lower end state in a reciprocation of the projection screen due to the hand shaking, and in a case where no correction is performed, as illustrated, a trapezoidal distortion occurs in the projection screen 13 and the correction projection screen 67, and also, projection content 27 in the correction projection screen 67 is distorted because of the trapezoidal distortion.

In FIG. 5(C), as to the trapezoidal distortion occurring in the correction projection screen 67 of FIG. 5(B), an image process is performed such that the long side of the trapezoid is shrunken to have the same length as the short side and the rectangular correction projection screen 66 is obtained on the wall 5. Following this correction, in FIG. 5(C), also, the distortion of the projection content 25 in the correction projection screen 66 is corrected. Further, also, the position of the correction projection screen 66 makes a parallel movement from a center to an upward position of the projection screen 13 as shown in FIG. 5(C), whereby the movements of the correction projection screen 66 and projection content 25 due to the downward movement of the projection screen 13 are corrected.

On the other hand, FIG. 5(D) shows an upper end state in the reciprocation of the projection screen due to the hand shaking, and in a case where no correction is performed, as illustrated, trapezoidal distortions of a projection screen 15 and a correction projection screen 69 become larger, and following this, also, projection content 29 in the correction projection screen 69 is further distorted. On the other hand, in FIG. 5(E), as to the trapezoidal distortion occurring in the correction projection screen 69 of FIG. 5(D), an image process is performed such that the long side of the trapezoid is shrunken at a rate different from FIG. 5(C) to have the same length as the short side and the rectangular correction projection screen 66 is obtained on the wall 5. Like the case of FIG. 5(C), following such correction, also, the distortion of the projection content 25 in the correction projection screen 66 is corrected. Further, in the correction of FIG. 5(E), also, the position of the correction projection screen 66 makes a parallel movement from a center to a downward position of the projection screen 15, whereby the movements of the correction projection screen 66 and projection content 25 due to the upward movement of the projection screen 15 are corrected. In the meantime, although not illustrated, in the correction at the central position of the hand shaking in the state of FIG. 5(B) and the state of FIG. 5(D), it goes without saying that the position of the correction projection screen 66 comes to the center of the trapezoidal projection screen.

Figure 5E:
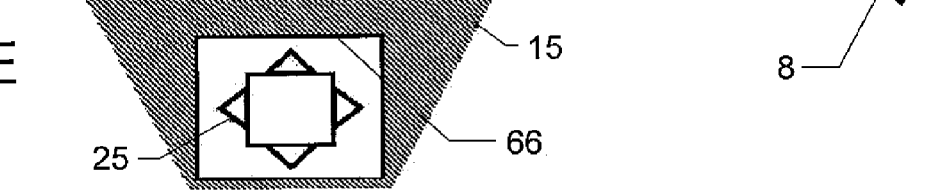

In the meantime, in the hand shaking correction between FIG. 5(C) and FIG. 5(E), not only for the vertical parallel movement of the correction projection screen 66 and projection content 25 but also for the extension/shrinkage of the upper side and lower side when obtaining the respective correction projection screens 66 from the correction projection screen 67 of FIG. 5(B) and from the correction projection screen 69 of FIG. 5(D), the trapezoidal distortion correction is performed at different rates. In other words, in the hand shaking correction during the time of the trapezoidal distortion correction show in FIG. 5, the correction is applied not only to the parallel movement deviation of the correction projection screen and correction content due to the hand shaking but also to the distortion deviation of the correction projection screen and correction content caused by a degree change in the trapezoidal distortion due to the hand shaking between FIG. 5(B) and FIG. 5(D).

FIG. 6 is a projection screen view and a corresponding schematic sectional view of a projection light path for describing measures against a change in the projection screen during the hand shaking correction in the case where the trapezoidal distortion correction is performed in the example 1. In the meantime, also in FIG. 6, the same portions as FIG. 1 to FIG. 5 are indicated by the same numbers, and the description is skipped as long as it is not necessary. A projection screen view and a schematic sectional view of a projection light path of FIG. 6(A) are the same as FIG. 5(B) and show a state where the projection to the wall 5 is performed. On the other hand, FIG. 6(B) to FIG. 6(E) show a hand shaking correction in a case where the projection optical axis 51 is further tilted upward and the projection is directed to a ceiling 53, and are used for describing a model in which hand shaking occurs between the state of FIG. 6(B) and the state of FIG. 6(D).

Specifically describing, FIG. 6(B) shows a lower end state (distant end state of the ceiling 53) in a reciprocation of the projection screen due to the hand shaking during the projection to the ceiling 53, and in a case where no correction is performed, as illustrated, a trapezoidal distortion occurs in a projection screen 17 and a correction projection screen 71, and also, projection content 31 in the correction projection screen 71 is distorted because of the trapezoidal distortion. In FIG. 6(C), as to the trapezoidal distortion occurring in the correction projection screen 71 of FIG. 6(B), an image process is performed such that the upper side and lower side of the trapezoid are extended/shrunken at different rates and the rectangular correction projection screen 66 is obtained. Following this correction, in FIG. 6(C), also, the distortion of the projection content 25 in the correction projection screen 66 is corrected. Further, also, the position of the correction projection screen 66 makes a parallel movement from a center to an upward position (to a near position of the ceiling 53) of the projection screen 17 as shown in FIG. 6(C), whereby the movements of the correction projection screen 66 and projection content 25 due to the downward movement (going away to a distant position of the ceiling 53) of the projection screen 17 are corrected.

On the other hand, FIG. 6(D) shows an upper end state (near end state of the ceiling 53) in the reciprocation of the projection screen due to the hand shaking during the projection to the ceiling 53, and in a case where no correction is performed, as illustrated, trapezoidal distortions of a projection screen 19 and a correction projection screen 73 become slightly small, and following this, also, a distortion of projection content 33 in the correction projection screen 73 becomes slightly small. On the other hand, in FIG. 6(E), as to the trapezoidal distortion occurring in the correction projection screen 73 of FIG. 6(D), an image process is performed such that the upper side and lower side of the trapezoid are extended/shrunken at different rates and the rectangular correction projection screen 66 is obtained. Like in the case of FIG. 6(C), following this correction, also, the distortion of the projection content 25 in the correction projection screen 66 is corrected. Further, during the correction of FIG. 6(E), also, the position of the correction projection screen 66 makes a parallel movement from a center to an downward position (to a distant position of the ceiling 53) of the projection screen 19, whereby the movements of the correction projection screen 66 and projection content 25 due to the upward movement (coming close to a near position of the ceiling 53) of the projection screen 19 are corrected.

Here, it should be noted that as is clear from a comparison of a set of FIG. 5(B) to FIG. 5(E) with a set of FIG. 6(B) to FIG. 6(E), between the case of the projection to the wall 5 and the case of the projection to the ceiling 53, a difference occurs in the hand shaking correction performed in a direction where the projection optical axis 51 in the projector portion 8 increases in the tilt from the horizontal direction to the vertical direction. First, the first difference is a difference in the shift direction of the correction projection screen 66 and projection content 25 in the correction project screen 66 with respect to the tilt of the projection optical axis 51. In other words, in the case of the projection to the wall 5, as is clear from FIG. 5(C) and FIG. 5(E), the image process is performed such that as the tilt of the projection optical axis 51 increases upward, the correction projection screen 66 and the projection content 25 in the correction projection screen 66 are shifted from a position near the long side of the trapezoid to a position near the short side of the trapezoid. On the other hand, in the case of the projection to the ceiling 53, as is clear from FIG. 6(C) and FIG. 6(E), the image process is performed such that as the tilt of the projection optical axis 51 increases upward, the correction projection screen 66 and the projection content 25 in the correction projection screen 66 are shifted from a position near the short side of the trapezoid to a position near the long side of the trapezoid.

The second difference is a difference in the extension/shrinkage rate of the upper side and lower side of the trapezoid for the trapezoidal distortion correction with respect to the tilt of the projection optical axis 51. In other words, in the case of the projection to the wall 5, as is clear from FIG. 5(B) and FIG. 5(D), it is necessary to perform the image process such that as the tilt of the projection optical axis 51 increases upward, the extension/shrinkage rates of the upper side and lower side of the trapezoid are raised to obtain the rectangular correction projection screen 66. On the other hand, in the case of the projection to the ceiling 53, as is clear from FIG. 6(B) and FIG. 6(D), it is necessary to perform the image process such that as the tilt of the projection optical axis 51 increases upward, the extension/shrinkage rates of the upper side and lower side of the trapezoid are lowered to obtain the rectangular correction projection screen 66. In the meantime, in a case where the projection is directed to a floor, the tilt of the projection optical axis 51 becomes negative; but, by considering a size relationship concerning the absolute value of the tilt, it is possible to understand in the same way as the projection to the ceiling; therefore, the description on the first and second differences in connection with the floor projection and the wall projection is skipped.

As described above, as to the switchover for performing the different image processes, it is possible to perform manually the switchover depending on whether the projection to the wall 5 is performed or the projection to the ceiling (or floor) is performed; but it is also possible to employ a structure, in which if the absolute value of the tilt of the projection optical axis 51 detected by the acceleration sensor 58 exceeds a predetermined angle (e.g., 45°), the projection is regarded as the projection to the ceiling (or floor) and the image process is automatically switched.

Figure 7:
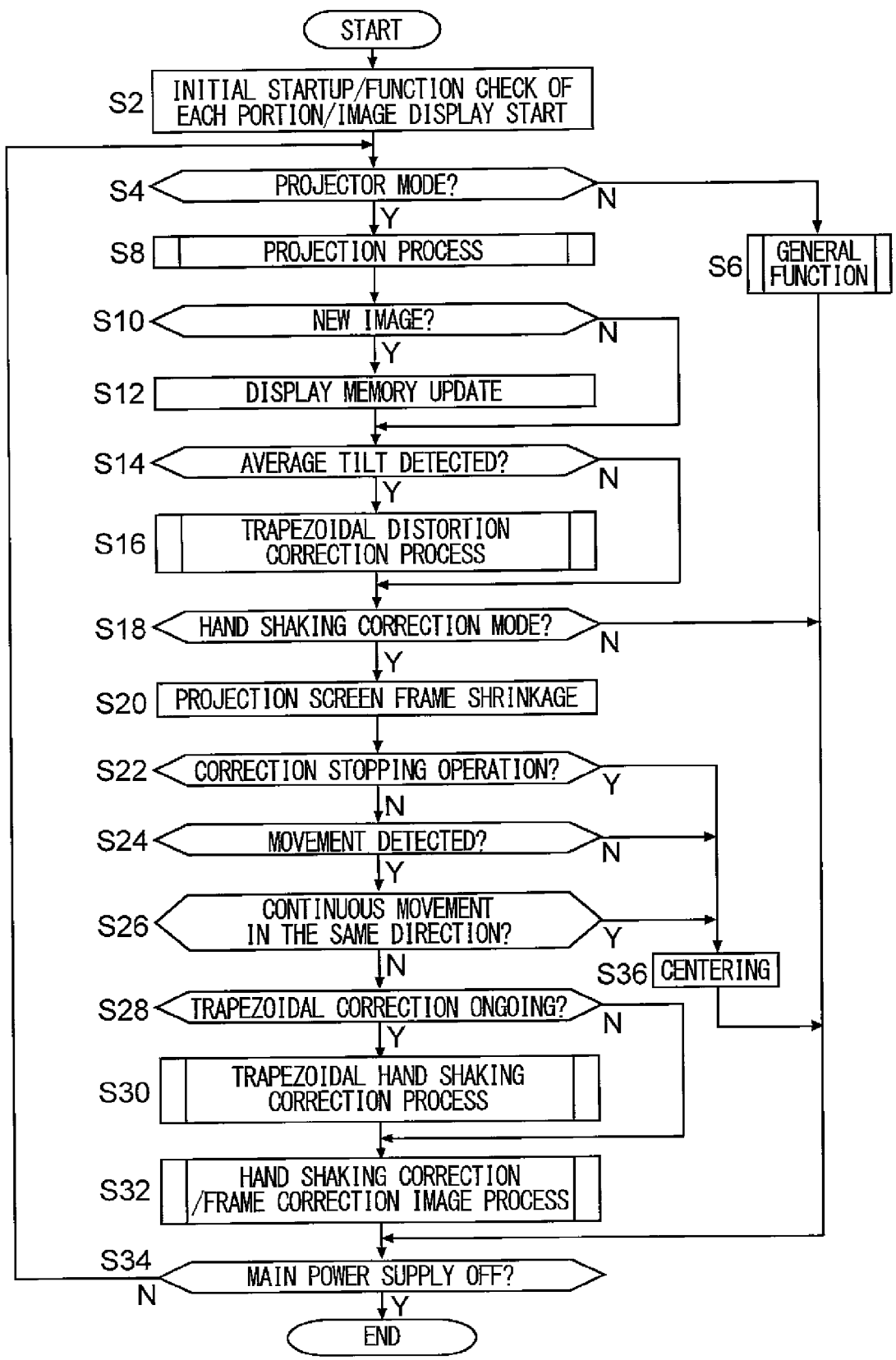
FIG. 7 is a flow chart of operation of a control portion in the example 1 of FIG. 2.

FIG. 7 is a flow chart of operation of the control portion 28 in the example 1 of FIG. 2. In the meantime, to describe mainly the operation of the projector, the flow of FIG. 7 selects and shows operations focusing on relevant functions; accordingly, there are also operations of the control portion 28 such as a function operation of a general mobile telephone and the like the that are not presented in the flow of FIG. 7. The flow of FIG. 7 starts when the main power supply is turned on by the operation portion 3 of the mobile telephone 2 with the projector, and in a step S2, performs an initial startup, checks a function of each portion, and starts a screen display on the large screen display portion 4. Next, in a step S4, it is checked whether the mobile telephone 2 with the projector is set to the projector mode by selecting from a menu or not. And if the setting of the projector mode is detected, the flow goes to a step S8. In the meantime, as described already, in a case where the mobile telephone 2 with the projector is not in the horizontally held state shown in FIG. 1(B), the projector mode is not displayed on the large screen display portion 4; therefore, the projector mode is not selected.

When the selection of the projector mode is not detected in the step S2, the flow goes to a general function of a step S6. The general function in the step S6 is a function such as a dialog function or the like that is generally provided in a mobile telephone. In the meantime, even during execution of the general function in the step S6, in a case where the mobile telephone 2 with the projector goes to the horizontally held state shown in FIG. 1(B); the projector mode is displayed on the menu and selected, interruption is executed and it is possible to go to a step S8 when necessary.

In the step S8, a projection process is performed. In this projection process, screen rewriting for one time is executed in accordance with a scan rate for the rewriting of the screen of the projector portion 8, and the projection of the display data is started. In the meantime, in the step S8, the projection, which is based on and faithful to the display data transmitted from the hand shaking/trapezoidal correction portion 56 to the projector portion 8, is executed, and control (i.e., control of transmitting the display data held by the display memory 30 as they are or transmitting the data after applying a hand shaking correction or a trapezoidal distortion correction to them) of transmitting what kind of display data from the hand shaking/trapezoidal correction portion 56 to the projector portion 8 is executed in a step S10 and following steps.

In the step 10, it is checked whether the control portion 28 issues an instruction for display of a new image or not, and if it is true, the flow goes to a step S12 to update the display data in the display memory 30 to the new image, and goes to a step S14. On the other hand, if there is not an instruction for display of a new image, the flow directly goes to the step S14. In the step S14, it is checked whether or not the acceleration sensor 58 detects that an average angle value of the projection optical axis 51 indicates a predetermined value or larger. When an average angle value larger than the predetermined value is detected, the flow goes to a step S16 to instruct the hand shaking/trapezoidal correction portion 56 to perform an image process for a trapezoidal distortion correction in accordance with the detected average tilt angle and goes to a step S18. On the other hand, when an average tilt equal to or larger than the predetermined tilt is not detected, the flow directly goes to the step S18.

In the step S18, it is checked whether a hand shaking correction mode is selected or not. And if a hand shaking mode is selected, the flow goes to a step S20 to instruct the hand shaking/trapezoidal distortion correction portion 56 to perform an image process for shrinking a projection image frame. This corresponds to shrinking the projection screen 10 and projection content 22 of FIG. 3(A) to the correction projection screen 66 and projection content 25 of FIG. 4(A). Next, in a step S22, it is checked whether a manual operation for stopping the correction is performed by means of the touch panel or not. This operation is for preventing an unnecessary hand shaking correction from being performed when moving the mobile telephone 2 with the projector to change a projection place; for example, this manual operation is performed before changing the projection place, continued during a time of moving the mobile telephone 2 with the projector, and terminated when a new projection place is decided and the moving of the mobile telephone 2 with the projector is stopped.

When the above-described correction stop operation is not detected in the step S22, the flow goes to a step S24 to check whether or not movement of the mobile telephone 2 with the projector based on hand shaking and the like is detected by the gyroscope 60 and the acceleration sensor 58. And if movement is detected, the flow goes to a step S26 to check whether the detected movement is a continuous movement in the same direction or not. This check is for preventing an unnecessary hand shaking correction from being performed when moving the mobile telephone 2 with the projector to change the projection place, that is, for stopping automatically an unnecessary hand shaking correction even in a case where this correction stop operation is not performed in the step S22.

In the step S26, in a case where it is confirmed that the detected movement is not a continuous movement in the same direction, the flow goes to a step S28 to check whether the trapezoidal distortion correction is ongoing or not. And if the trapezoidal distortion correction is ongoing, the flow goes to a step S30 to perform the trapezoidal hand shaking correction process and goes to a step S32. The step S30 is responsible for a correction unique to the trapezoidal distortion correction in the hand shaking correction during the time of the trapezoidal distortion correction described based on FIG. 5 and FIG. 6. On the other hand, in the step S28, in a case where it is not detected that the trapezoidal distortion correction is ongoing, the flow goes to the step S32.

In the step S32, the process for performing the hand shaking correction of the projection content and for correcting the deviation of the frame caused by the hand shaking is performed. This process is responsible for a common process irrespective of presence of the trapezoidal distortion correction of the hand shaking correction described based on FIG. 4 to FIG. 6. In the meantime, for the sake of understanding, the step S28 to the step S32 are divided into elements and illustrated; but these steps may be executed as a whole process in which these steps are mingled with each other. Besides, in the case where the steps are divided into the elements and executed, the step S32 may be executed before the step S28 and the step S30.

When the hand shaking/frame correction image process of the step S32 is ended, the flow advances to a step S34 to check whether the main power supply is in an off-state or not. In the meantime, as to a case where a correction stop operation is detected in the step S22 or a case where a continuous movement in the same direction is detected in the step S26, these cases correspond to the case where the mobile telephone 2 with the projector is moved to change the projection place; therefore, the flow does not advance to the step S28, and the hand shaking correction is not performed; but instead, the flow goes to a step S36. Besides, also in a case where movement is not detected in the step S24, the deviation correction is not necessary; therefore, the flow goes to the step S36. In the step S36, as shown in FIG. 4(A), FIG. 5(A), FIG. 5(B), FIG. 5(D), FIG. 6(A), FIG. 6(B), and FIG. 6(D), centering is performed such that the correction projection screen 66 and the like come to the center of the projection screen 10. This is for securing an area for a correction in various directions when hand shaking occurs at a new projection place. In other words, for example, if the hand shaking correction is started from the state of FIG. 4(B) at the new projection position, when a hand shaking movement to a further right lower position occurs, there is almost no area for shifting further the correction projection screen 66 in the projection screen 10 to correct the hand shaking movement. On the other hand, if the centering of the correction projection screen 66 is performed to move to the state of FIG. 4(A) at the new projection position, it becomes possible to perform a shift as shown in FIG. 4(B). Even in a state where there is no hand shaking, like the case where the mobile telephone 2 with the projector is moved, the centering is performed to secure an area for a hand shaking correction in various directions which could occur afterwards.

When the centering in the step S36 is ended, the flow goes to the step S34. Besides, also in a case where the hand shaking mode is not selected in the step S18, the flow directly goes to the step S34. Further, also in a case where the general function in the step S6 is ended, the flow goes to the step S34. In the step S34, it is checked whether the main power supply is in the turned-off state or not. And if the main power supply is kept in the on-state, the flow returns to the step S4, thereafter, as long as the projector mode is continued, the step S4 and the step S8 to the step S36 are repeated at each image rewriting timing to continue the execution of the projection and hand shaking correction. Besides, if the projector mode is not selected, the general function is kept.

Figure 8:
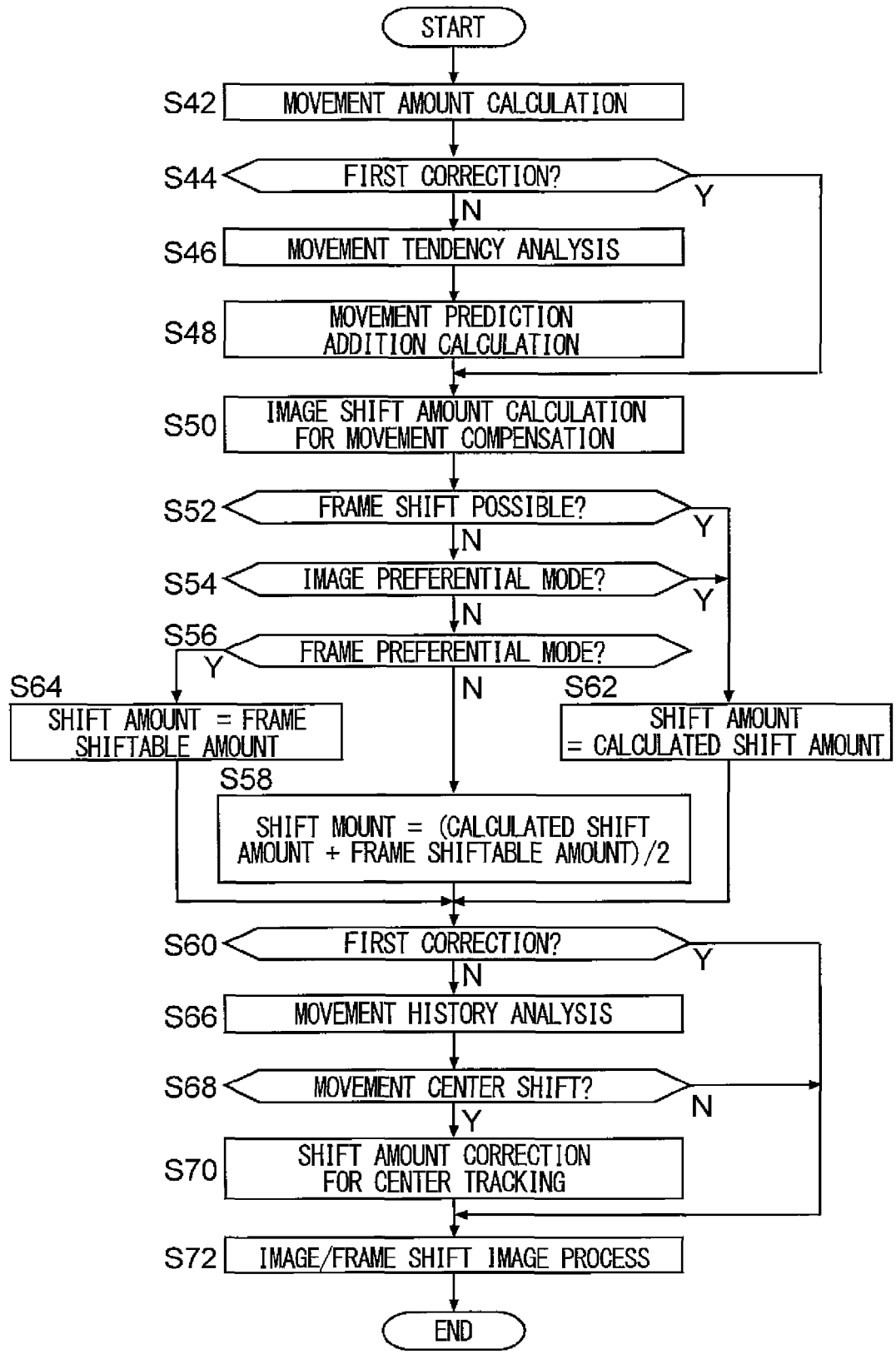
FIG. 8 is a flow chart for describing details of a step S32 of FIG. 7.

FIG. 8 is a flow chart showing details of the hand shaking correction/frame correction image process in the step S32 of FIG. 7. When the flow starts, in a step S42, a hand shaking movement amount is calculated based on the detection results from the gyroscope 60 and the acceleration sensor 58. And in a step S44, it is checked whether the correction is a first correction or not, if it is not the first correction, the flow advances to a step S46, where a movement tendency is analyzed based on movement data in the past. Based on this analysis result, in a step S48, a movement prediction amount is added to the movement amount calculated in the step S42 to correct the calculated movement amount, and the flow goes to a step S50. On the other hand, if it is the first correction, the calculation result in the step S42 is employed as it is, and the flow directly goes to the step S50.

In the step S50, an image shift amount for compensating for the hand shaking movement is calculated. Next, in a step S52, it is checked whether the frame of the correction projection screen 66 is shiftable in the frame of the projection screen 10 based on the calculated shift amount. In a case where the calculated shift amount exceeds a frame shift enable amount and a shift is impossible, the flow advances to a step S54 to check whether an image preferential mode is set or not. The image preferential mode is a mode for performing a correction to stop the deviation of the projection content even if a slight deviation of the projection screen frame is tolerated. If the image preferential mode is not set, the flow advances to a step S56 to check whether a frame preferential mode is set or not. The frame preferential mode is a mode for performing a correction to stop the deviation of the projection screen frame even if a slight deviation of the projection content is tolerated. In a case where the setting of the frame preferential mode cannot be confirmed, the flow advances to a step S58, where an average amount of the calculated shift amount and frame shift enable amount is employed as a shift amount, and the flow goes to a step S60. As a result of this, an amount, by which the calculated shift amount is larger than the frame shift enable amount, is dispersed to the deviation of the projection screen frame and the deviation of the projection content, whereby a conspicuous deviation is restrained from remaining in either one only.

On the other hand, in a case where it is confirmed in the step S52 that the calculated shift amount is not larger than the frame shift enable amount, or in a case where the setting of the image preferential mode is confirmed in the step S54, the calculated shift amount is employed as a shift amount, and the flow goes to the step S60. On the other hand, in a case where the setting of the frame preferential mode is confirmed in the step S56, the frame shift enable amount is employed as a shift amount, and the flow goes to the step S60.

In the step S60, it is checked whether the correction is the first correction or not, and if it is not the first correction, the flow advances to a step S66, where a movement history is analyzed based on the movement data in the past. Based on this analysis result, in a step S68, it is checked whether the center of the hand shaking movement is shifted or not. The center of the hand shaking movement is considered to be a projection position intended by the operator, and if the center moves, the image correction for returning the projection position to the original position becomes inappropriate. If a movement center shift is detected in the step S68, the flow advances to a step S70, corrects an image process shift amount to track the moved center, and goes to a step S72. On the other hand, in a case where the correction is confirmed to be the first correction in the step S60, or in a case where there is no shift of the movement center, the shift amount decided in the step S58, step S62, or step S64 is employed as it is, and the flow directly goes to the step S72. In the step S72, based on the shift amount decided in this way, the hand shaking/trapezoidal correction portion 56 is instructed to perform an image process to shift the correction projection screen frame and the correction content in the correction projection screen frame, and he flow is ended.

Example 2

FIG. 9 is a perspective view showing an example 2 of a mobile telephone with a projector according to an embodiment of the present invention. In the example 2, a projector portion 108 is rotatable 90° and structured to be able to perform the projection in both the vertically held state and the horizontally held state. The example 2 has many portions common to the example 1; therefore, each portion is indicated by a number on the order of 100 with common second and first digits used at corresponding positions, and the description is skipped as long as it is not necessary.

Figure 9A:
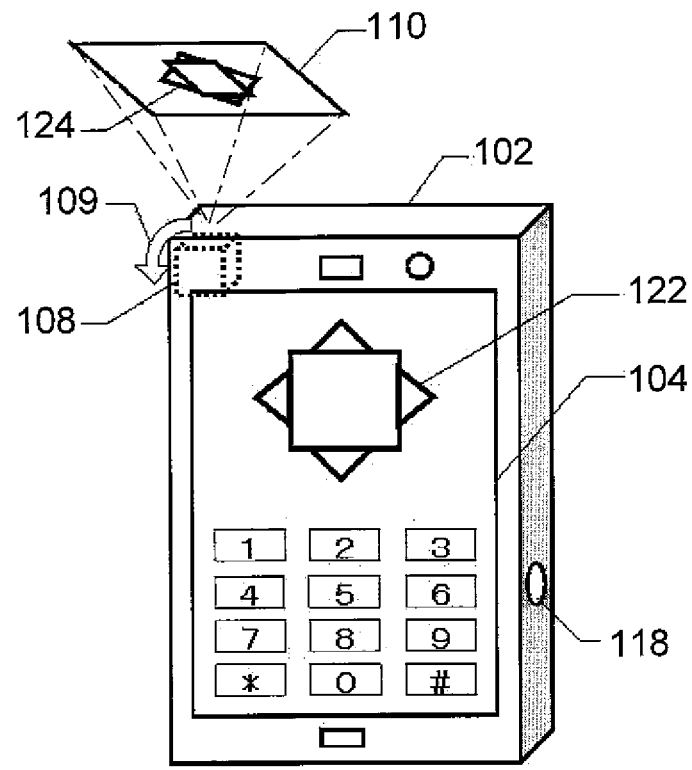
FIG. 9 is a perspective view showing an example 2 of a mobile telephone with a projector according to an embodiment of the present invention (example 2).

Specifically describing, FIG. 9(A) shows a case where a mobile telephone 102 with a projector is vertically held with one hand and a projection screen 110 is projected. As is clear from the figure, in the example 2, the projector portion 108 is disposed at a left upper corner in the vertically held state. In the vertically held state, projection content 122 is displayed on an upper half of a large screen display portion 104, and it becomes possible to perform description or operation of the projection screen 110 monitoring the projection content 122. To prevent an unnecessary hand shaking correction from being performed when changing the projection place by the one hand operation, the mobile telephone 102 with the projector is moved with a correction stop button 118 kept depressed. And when a new projection place is decided and the mobile telephone 102 with the projector is stopped, the correction stop button 118 is released. According to this, the hand shaking correction is resumed.

Figure 9B:
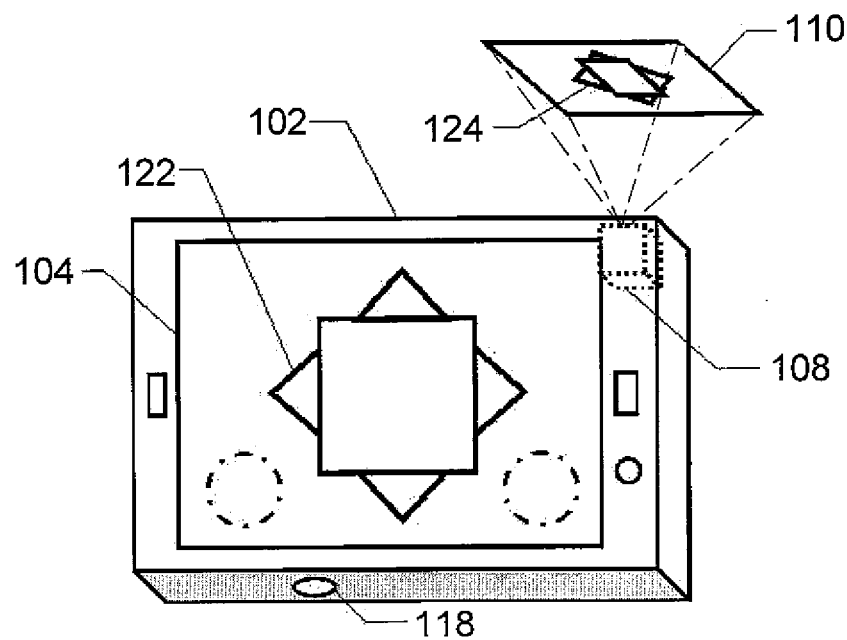

FIG. 9(B) shows a state where the projector portion 108 is rotated 90° in an arrow 109 direction to move to the horizontally held state. FIG. 9(B) is common to FIG. 1(B) except for that the projector portion 108 is situated at a right upper corner. Specifically, following the position change of the projector portion 108, the position of the gyroscope 60 also is moved to be able to suitably detect a rotation centering on a projection optical axis. The description of the other structures is skipped. In the meantime, also in the example 2, it is possible to use the block diagram of FIG. 2 and the function details described based on FIG. 3 to FIG. 8.

Example 3

FIG. 10 is a projection screen view for describing a hand shaking correction related to an example 3 of a mobile telephone with a projector according to an embodiment of the present invention. In the meantime, as to an appearance and a block diagram of the example 3, it is possible to use the example 1; therefore, the illustration is skipped. In the hand shaking correction of the example 1, as shown in the projection screen view of FIG. 4(A), the correction projection screen 66 is set slightly inside the projection screen 10, the projection content 22 is slightly shrunken, and the hand shaking correction is applied not only to the projection content 25 but also to the correction projection screen 66. On the other hand, in the example 3, the projection screen 10 and the projection content 22 are not shrunken, and the hand shaking correction is applied to the projection content 22 only. And, as to the projection screen 10, to prevent flickering due to the deviation indicated by the arrow 64 of FIG. 3(C) from becoming conspicuous, as shown in FIG. 10, a structure is employed to blur the frame of the projection screen 10. In the meantime, in the example of FIG. 10, for the sake of a comparison with the example 1, portions corresponding to FIG. 3 and FIG. 4 are indicated by the same numbers.

Figure 10A:
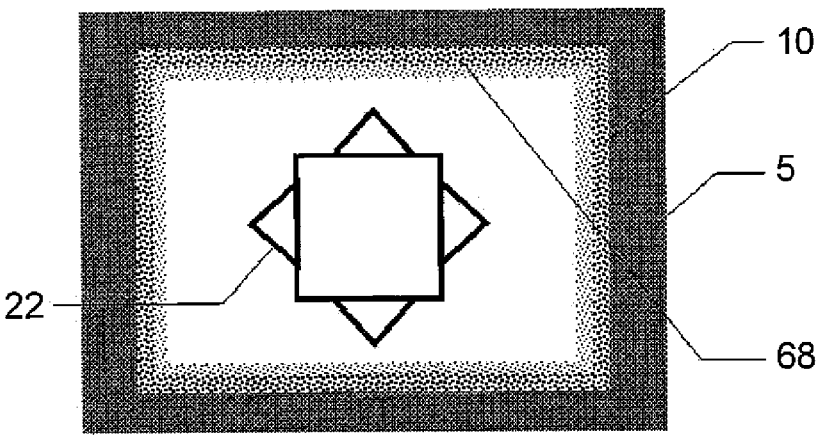
FIG. 10 is a projection screen view for describing a hand shaking correction related to an example 3 of a mobile telephone with a projector according to an embodiment of the present invention (example 3).
Figure 10B:
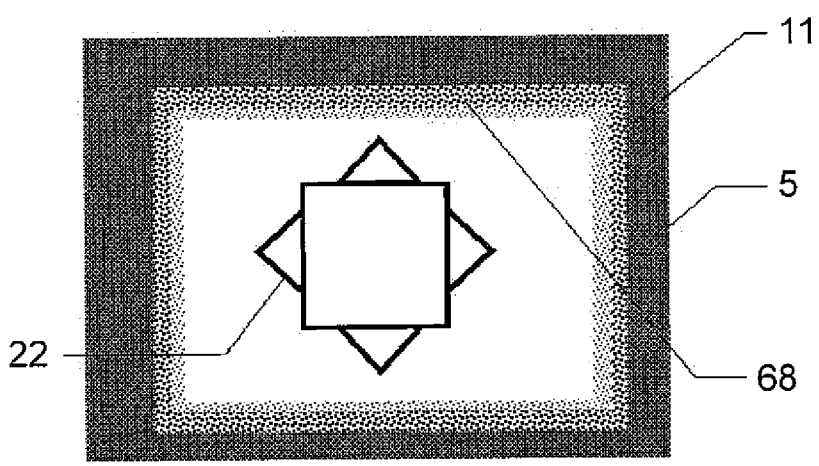
Figure 10C:
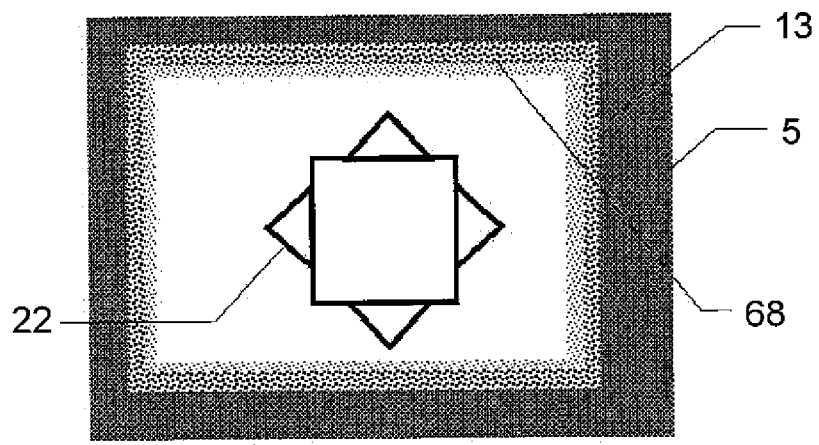

Specifically describing, as shown in FIG. 10(A), a gradation 68, which gradually becomes darker from a portion slightly inside the frame toward the frame, is applied to the projection screen 10, whereby the boundary between the projection screen 10 and the wall 5 is blurred. FIG. 10(B) shows a state, in which when the projection screen 10 is deviated to a right lower position by the hand shaking to move to a state of the projection screen 11, the projection content in the projection screen 11 is shifted in a left upper direction opposite to the deviation by means of the image process and held at the position of the projection content 22. In contrast to FIG. 10(B), FIG. 10(C) shows a state, in which the when the projection screen 10 is deviated from FIG. 10(A) used as a reference to a left upper position by the hand shaking to move to a state of the projection screen 13, the projection content in the projection screen 13 is shifted in a right lower direction opposite to the deviation by means of the image process and held at the position of the projection content 22. As described above, in the example 3, the frame of the projection screen 10 moves because of the hand shaking, but the boundary between the projection screen 10 and the wall 5 is blurred; therefore, the flickering due to the movement of the projection screen 10 is inconspicuous. As described above, in the example 3, in contrast to the example 1, an area for correcting the deviation of the frame of the projection screen 10 is secured; therefore, the problem of the frame deviation due to the hand shaking is alleviated without shrinking the projection content.

Figure 11:
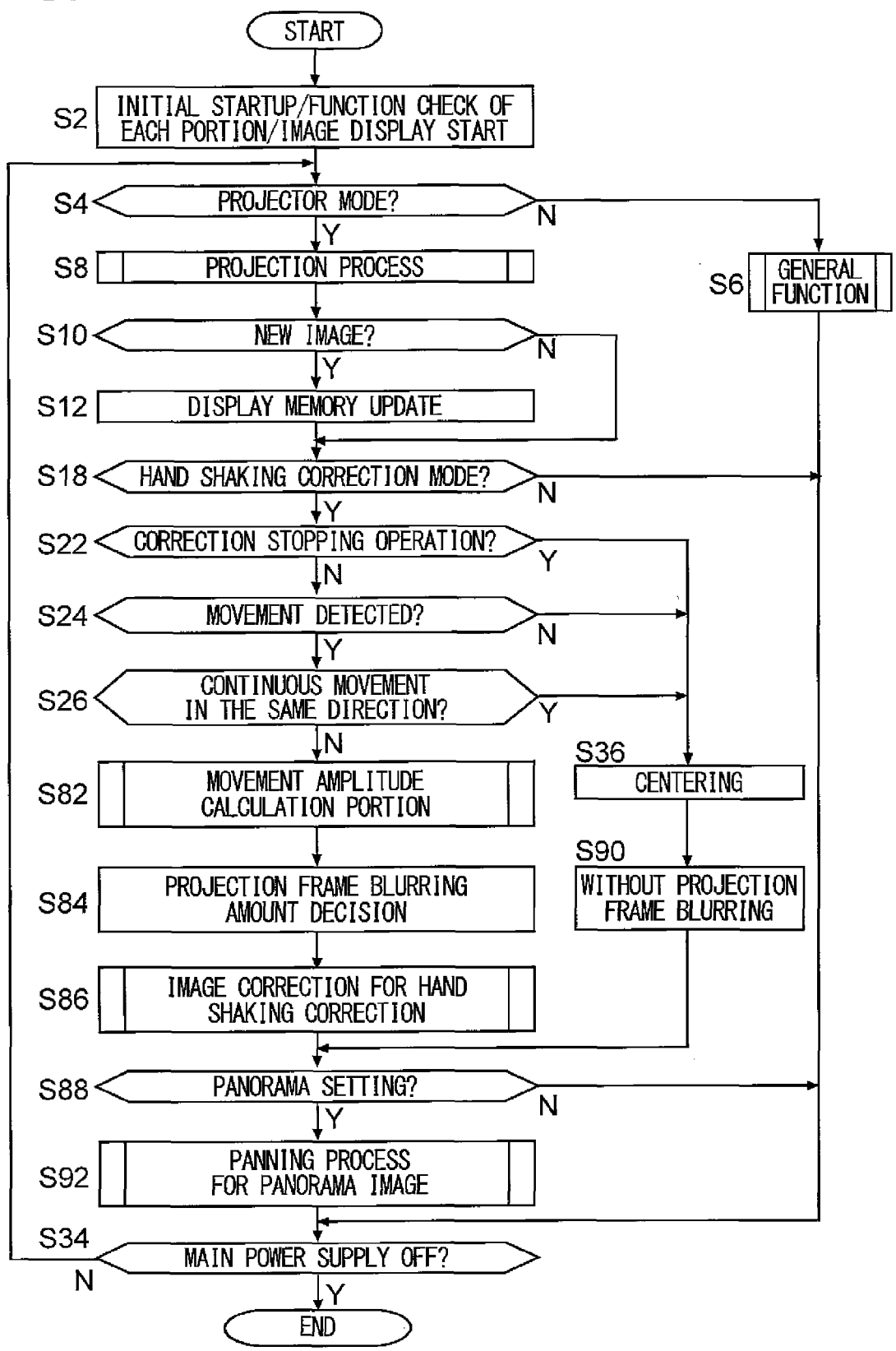
FIG. 11 is a flow chart of operation of a control portion in the example 3.

FIG. 11 is a flow chart of operation of the control portion 28 (FIG. 2 is used) in the example 3. In the meantime, the flow chart of FIG. 11 has many portions common to the flow chart of the example 1 of FIG. 7; therefore, similar steps are indicated by the same step numbers and the description is skipped, and different steps are indicated with bold letters. Besides, the step S14 and step S16 related to the trapezoidal correction and the step S20 related to the projection screen frame shrinkage of FIG. 7 are deleted.

The flow chart of the example 3 of FIG. 11 is different from the flow chart of the example 1 of FIG. 7 in steps following the step S26 and steps following the step S36 as indicated with bold letters. Specifically, in the step S26, if it is confirmed that a movement, which is not a continuous movement in the same direction, is detected, the flow goes to a step S82. In other words, in the hand shaking correction mode, when the hand shaking is detected in a state where the correction stop operation is not performed, the flow advances from the step S26 to the step S82 and performs a process to calculate an amplitude of a reciprocation movement due to the hand shaking. Next, in a step S84, a blurring amount (width of the gradation 68 of FIG. 10) of the projection frame is decided in accordance with the calculated movement amplitude. Specifically, the larger the movement amplitude is, the wider the width of the gradation is made. In this way, the projection frame is blurred, and a hand shaking correction image process in a step S86 is performed, then the flow goes to a step S88. The hand shaking correction image process in the step S86 removes, from the step S32 of FIG. 7, the process related to the deviation correction of the projection frame, which is described in detail later.

On the other hand, following the centering in the step S36 in a case where a correction stop operation is detected in the step S22, or in a case where a movement is not detected in the step S24, or in a case where a continuous movement in the same direction is detected in the step S26, a process for not-blurring the projection frame is performed in a step S90, then the flow goes to a step S88. In these cases, there is no hand shaking correction; therefore, it is necessary to prevent a region, where clear projection content is displayed, from being narrowed by the blurring.

In the step S88, it is checked whether a panorama setting is performed or not. The panorama setting is a setting in which projection image information for a wide area is stored in the storage portion 26; and the display data of the display memory 30 are rewritten in accordance with a movement of the mobile telephone 2 with the projector detected by the gyroscope 60 and the acceleration sensor 58. In other words, it is a setting in which like a case where if panning is performed by moving a telescope, a portion of a scene confined in the telescope view field is shifted, projection rendering is performed such that if the panning is performed by moving the mobile telephone 2 with the projector, a portion of a scene confined in the projection screen is shifted. And if it is detected that a panorama setting is performed, the flow goes to a step S92 to perform a panning process for a panorama image and goes to the step S34. The process in the step S92 is a process in which the display data of the display memory 30 is rewritten by cutting away a portion of the projection image information for a wide area stored in the storage portion 26 in accordance with the data detected by the gyroscope 60 and the acceleration sensor 58. On the other hand, if a panorama setting is not detected in the step S88, the flow directly goes to the step S34.

Like the flow of FIG. 7, the flow of FIG. 11 repeats the steps of S4 to S36 and the steps of S82 to S92 as long as the turning-off of the main power supply is not detected in the step S34. During this repetition, when the flow goes to the step S92 via the steps of S86 to S88 for the first time, the handshaking correction is performed; but next, the panning is detected and the flow goes from the step S26 to the step S36; therefore, substantially, during the panning, an image obtained by applying the centering to the projection content is projected without blurring the projection frame. But even if the panorama setting is performed, if the panning is stopped, the flow can go to the steps of S26 to S82; therefore, the hand shaking correction process is performed.

Figure 12:
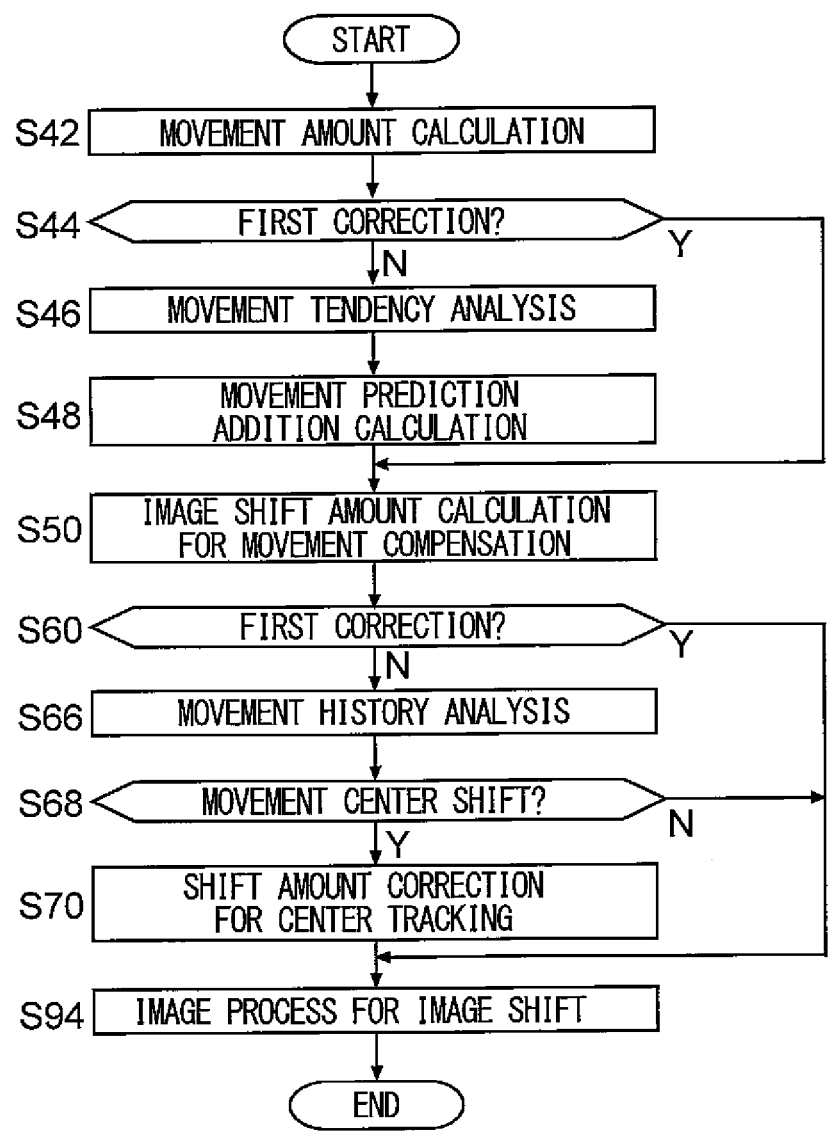
FIG. 12 is a flow chart for describing details of a step S86 of FIG. 11.

FIG. 12 is a flow chart for describing details of the hand shaking correction image process in the step S86 of FIG. 11. As described above, the step S86 of FIG. 11 removes the process related to the deviation correction of the projection frame from the flow chart of FIG. 8 that indicates the step S32 of FIG. 7 in detail; therefore, the same steps as FIG. 8 are indicated by the same step numbers and the description is skipped. Describing only portions different from FIG. 8, in FIG. 12, the calculated shift amount is always used as the shift amount, and the flow goes from the step S50 to the step S60. Besides, a step S94 is an image process for an image shift, that is, an image process in which a correlation between the projection frame blurred with a gradation and the projection content changes.

Practical use of the various features of the present invention described above is not limited to the above examples, and as long as the advantages are obtainable, various modifications are possible. For example, in the projection frame correction of the example 1, in FIG. 4, when setting the correction projection screen 66, the projection content 25 is shrunken to a similar shape; but instead, a structure may be employed, in which the projection content 22 is not shrunken and displayed with a portion extending from the correction projection screen 66 to the projection frame 10 cut away.

Besides, the practical use of the various features of the present invention described above is not limited to the above examples, and as long as the advantages are obtainable, it is possible to use the features in various forms. For example, in the examples, the projector portion is incorporated in the mobile telephone; but it is possible to use the projector portion as a stand-alone mobile projector, and also possible to use the projector portion by incorporating it in other various mobile apparatuses such as a music player and the like.

Further, the various features of the respective examples are not unique to the individual examples but can be exchanged or used together when necessary. For example, the structure for blurring the projection frame in the example 3 is usable in the example 1. In this case, for example, the structure is useful when the frame preferential mode is not set in the step S56 of FIG. 8 in the example 1 and the frame deviation cannot be corrected. More specifically, a structure is employed, in which when the flow reaches the step S62 or the step S58 of FIG. 8, a gradation, which has a width in accordance with a size of hand shaking that is not correctable, is applied to the projection frame.

Example 4

FIG. 13 is a projection screen view for describing a hand shaking correction related to an example 4 of a mobile telephone with a projector according to an embodiment of the present invention. In the meantime, as to an appearance and a block diagram of the example 4, it is possible to use the example 1; therefore, the illustration is skipped. Besides, the example 4 is obtained by adding a function to the example 3, and as to the basic operation of the control portion 28 (FIG. 2 is used), it is possible to use the flow chart in the example 3 of FIG. 11; therefore, the illustration is skipped.

Next, the function of the example 4 added to the example 3 is described. In the example 3, as shown in FIG. 10, the hand shaking correction is applied to the projection content 22 only, and the flickering of the frame due to the deviation is made inconspicuous by blurring the frame of the projection screen 10 by means of the gradation 68. This means that the hand shaking correction is performed by scrolling the projection content 22 in the blurred frame of the projection screen 10 and premises that the entire image of the projection content 22 has too large quantity of information to be confined in the projection screen 10. But as to some display content, the entire target image is confined in the projection screen 10, and there is a case where if the target image is shifted, a piece of image information in the projection screen 10 is lost. The example 4 is structured to deal with even such a case.

Figure 13A:
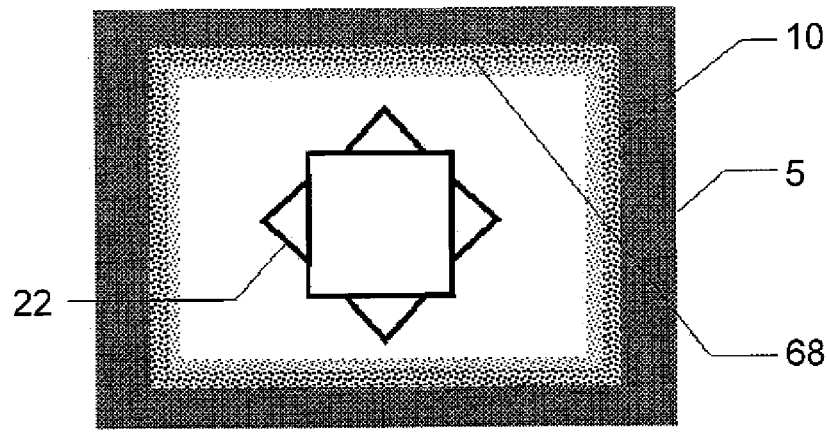
FIG. 13 is a projection screen view for describing a hand shaking correction related to an example 4 of a mobile telephone with a projector according to an embodiment of the present invention (example 4).
Figure 13B:
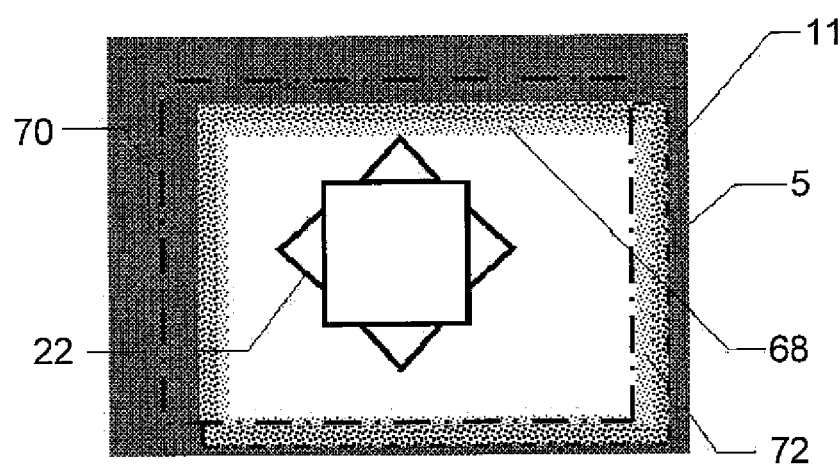

Specifically describing, FIG. 13(A) is the same view as FIG. 10(A), and a portion near the frame of the projection screen 10, that is, the boundary with the wall 5 is blurred by means of the gradation 68. FIG. 13(B) shows a state where the projection screen 10 is deviated to a right lower position by hand shaking to move to the state of projection screen 11 in the same way as FIG. 10(B). At this time, assuming that the entire display content is confined in the projection screen 10 in the state of FIG. 13(A), if the hand shaking correction is performed to shift the projection content in a left upper direction as shown in FIG. 13(B), a piece of image information is lost outside the area of the original image 70 indicated virtually by a one-dot-one-bar line and inside the projection screen 11. In the example 4, in such a case, the lost portion is compensated for by means of a gradation image 72 prepared beforehand to prevent an uncomfortable feeling from occurring in the blurred portion of the boundary with the wall 5.

Figure 13C:
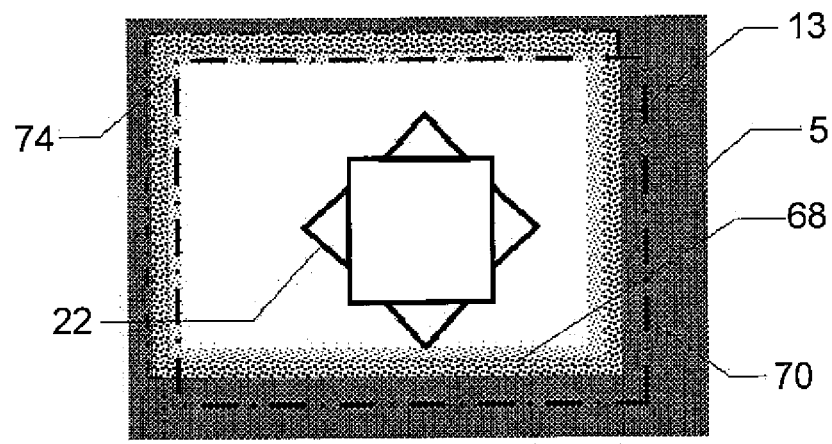

FIG. 13(C) shows a state where the projection screen 10 is deviated to a right lower position by hand shaking to move to the state of projection screen 13 in the same way as FIG. 10(C). In this case as well, a lost portion of the image information, which occurs outside the original image 70 indicated virtually by a one-dot-one-bar line and inside the projection screen 13, is compensated for by means of a gradation image 74 prepared beforehand to prevent an uncomfortable feeling from occurring in the blurred portion of the boundary with the wall 5. As is clear from a comparison between FIG. 13(B) and FIG. 13(C), the gradation information 72, 74 has a different gradation direction depending on a portion where the lost portion occurs. Because of this, in the example 4, blurring image data for the compensation, which have gradations corresponding to each position (an upward position, a downward position, a rightward position, a leftward position, a right upper corner, a right lower corner, a left upper corner and a left lower corner) of the projection image respectively, are prepared beforehand and provided in accordance with an image shift direction for the hand shaking correction.

Figure 14:
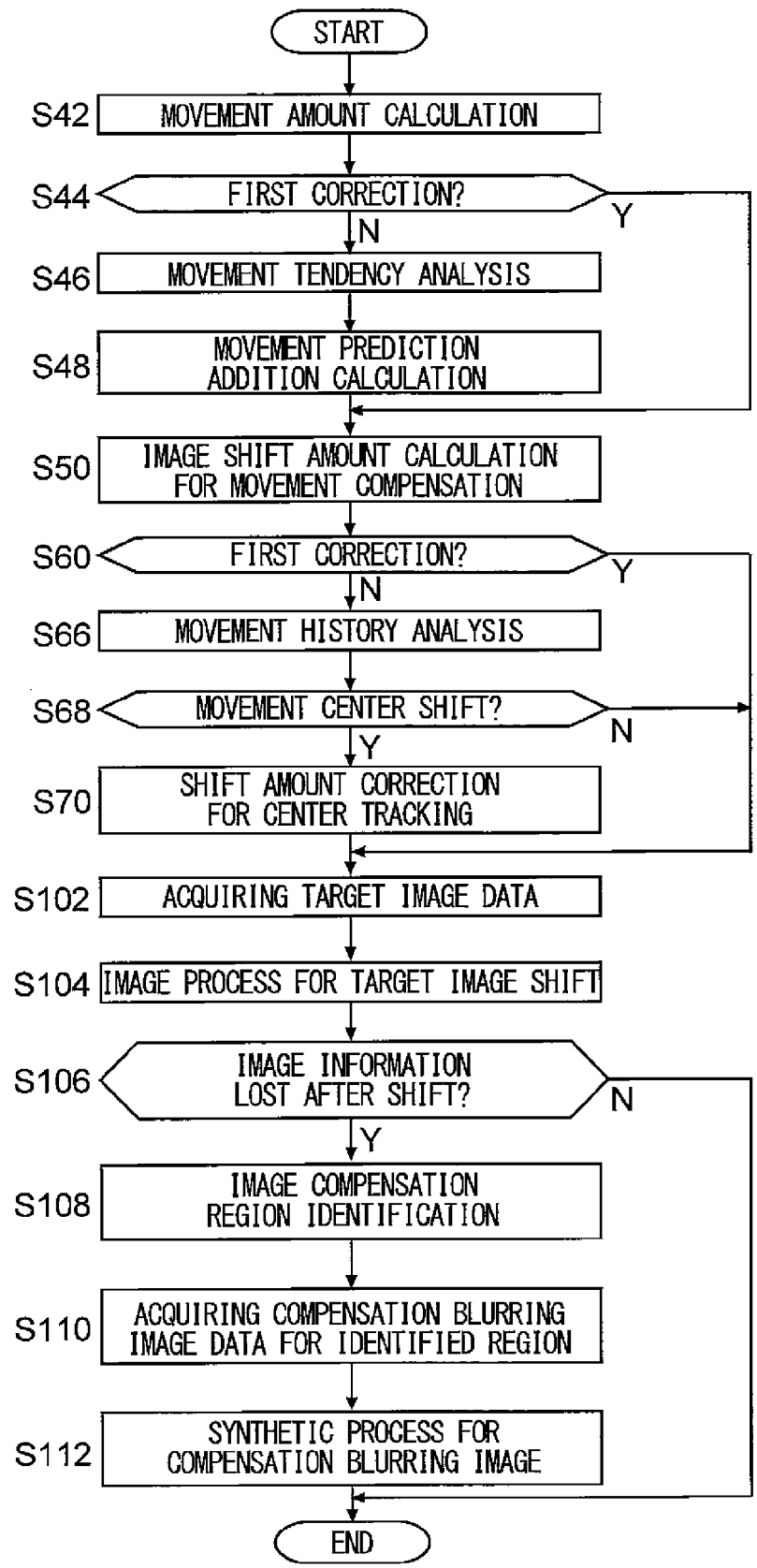
FIG. 14 is a flow chart for describing an additional function in FIG. 4.

FIG. 14 is a flow chart for describing the above added function in FIG. 4. As described above, the basic operation of the example 4 uses the flow chart in the example 3 of FIG. 11, and FIG. 14 is a flow chart describing details of the hand shaking image process in the step S86 of FIG. 11. Besides, the steps of S42 to S70 of FIG. 14 are common to the flow chart in the example 3 of FIG. 12; therefore, the description is skipped.

In FIG. 14, if the flow reaches a step S102 via the step S60 or via the step S70, target image data are acquired, and in a step S104, the image process is applied to the target image data to perform a shift process. Next, in a step S106, it is checked whether the image information after the shift loses a portion or not, and if there is no lost portion, the flow is ended. The operation in this case ends in the same result as the example 3 of FIG. 12.

On the other hand, if it is detected in the step S106 that there is a lost portion, the flow advances to a step S108, where an image region to be compensated for is identified. And in a step S110, blurring image data for the compensation for the identified image region are acquired, and in a step S112, a synthetic process of the display image data after the shift and the compensation blurring image data is performed, and the flow is ended.

Example 5

Figure 15:
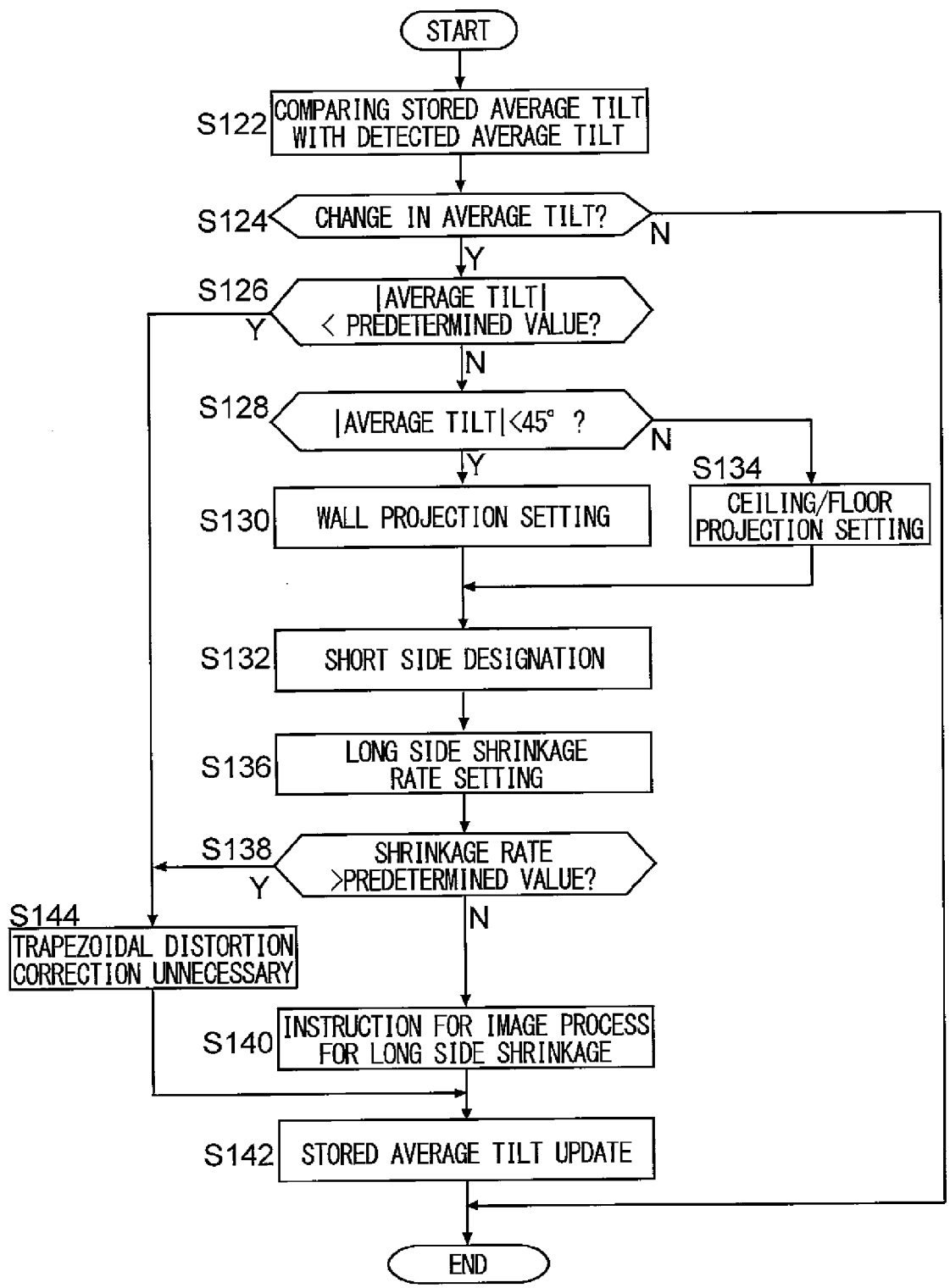
FIG. 15 is a flow chart of a trapezoidal correction related an example 5 of a mobile telephone with a projector according to an embodiment of the present invention (example 5).

FIG. 15 is a flow chart of a trapezoidal correction related an example 5 of a mobile telephone with a projector according to an embodiment of the present invention. In the meantime, as to an appearance and a block diagram of the example 5, it is possible to use the example 1; therefore, the illustration is skipped. Besides, the example 5 shows an example in which a portion of the function of the example 1 is embodied, and as to the basic operation of the control portion 28 (FIG. 2 is used), the flow chart of FIG. 7 is used. Specifically describing, the flow chart of FIG. 15 replaces the step S14 and step S16 of FIG. 7 and the other functions are common to FIG. 7.

The embodied function in the example 5 is a function for dealing with a change in the projection surfaces between the wall 5 and the ceiling 53 described based on FIG. 6 in connection with the example 1. Describing the function, when the flow reaches the step S14 in FIG. 7, the flow of FIG. 15 starts and reaches a step S122. And in the step S122, a stored average tilt and a new detected average tilt are compared with each other, and in a step S124, it is checked whether there is a change in the average tilt. If there is not a change in the average tilt, the flow is immediately ended, and the process goes to the step S18 of FIG. 7.

On the other hand, if it is detected that there is a change in the average tilt in the step S124 of FIG. 15, the flow goes to a step S126, where it is checked whether or not the absolute value of the average tilt is equal to or smaller than a predetermined value (e.g., an angle of 10° or the like under which the average tilt is nearly horizontal and a trapezoidal deformation is not conspicuous.). And in a case where the absolute value of the average tilt is larger than the predetermined value, the flow goes to a step S128, where it is checked whether the absolute value of the average tilt is equal to or smaller than 45° or not. In a case where the absolute value of the average tilt is smaller than 45°, a flag is set to indicate a wall projection state in a step S130, and in a step S132, based on this setting, a short side of a trapezoidal distortion is designated and the flow goes to a step S136. Specifically, in a case where the average tilt is positive, a lower side of the projection screen is designate as the short side, while in a case where the average tilt is negative, an upper side of the projection screen is designated as the short side. On the other hand, in a case where it is detected that the absolute value of the average tilt is larger than 45° in a step S128, a flag is set to indicate a ceiling projection state or a floor projection state in a step S134, and in the step S132, based on this setting, the short side of the trapezoidal distortion is designated and the flow goes to the step S136. Specifically, in a case where the average tilt is positive, it is determined to be a ceiling projection and the upper side of the projection screen is designated as the short side, while in a case where the average tilt is negative, it is determined to be a floor projection and the lower side of the projection screen is designated as the short side.

In the step S136, to correct the trapezoid to a rectangle based on the average tilt, a shrinkage rate of the long side is set. And in a step S138, it is checked whether the shrinkage rate is larger than a predetermined value or not in a step S138. If the shrinkage rate is equal to or smaller than the predetermined value, the flow advances to a step S140 to issue an instruction for an image process for shrinking the long side at the set shrinkage rate and obtaining a rectangular image. Next, in a step S142, the stored average tilt is updated to the new average tilt that is the basis of the above process, the flow is ended and the process goes to the step S18 of FIG. 7.

On the other hand, in a case where it is detected in the step S126 that the absolute value of the average tilt is smaller than the predetermined value, the flow goes to a step S144. And in this case, as described above, it is conceivable that the average tilt is an average tilt at which the trapezoidal distortion is inconspicuous; therefore, in the step S144, a flag is set to indicate that the trapezoidal correction is unnecessary, and the flow goes to the step S142. In the step S142, also in this case, the stored average tilt is updated to the new average tilt. In a case where the shrinkage rate is larger than the predetermined value in the step S138, the flow goes to the step S144 to set a flag to indicate that there is no trapezoidal distortion. This is intended to give higher priority to the image information with the distortion left as it is than to excessively shrinking the long side in a case where the trapezoidal distortion is too large.

Example 6

Figure 16:
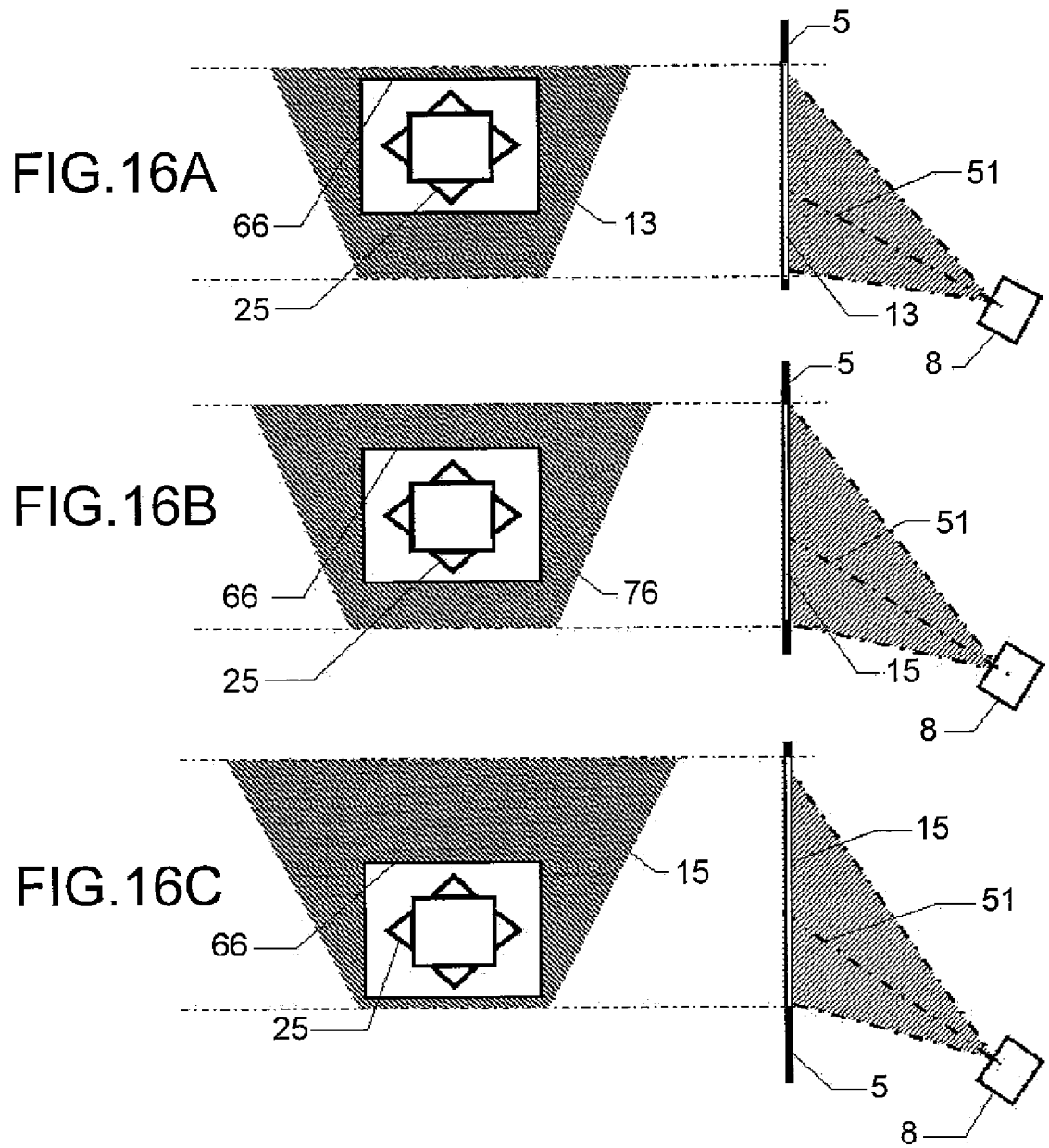
FIG. 16 is a projection screen view for describing a hand shaking correction during a trapezoidal distortion correction related to an example 6 of a mobile telephone with a projector according to an embodiment of the present invention (example 6).

FIG. 16 is a projection screen view for describing a hand shaking correction during a trapezoidal distortion correction related to an example 6 of a mobile telephone with a projector according to an embodiment of the present invention. In the meantime, as to an appearance and a block diagram of the example 6, it is possible to use the example 1; therefore, the illustration is skipped.

FIG. 16(A) and FIG. 16(C) correspond to the states of FIG. 5(C) and FIG. 5(E) respectively described in the example 1, and show that hand shaking occurs between FIG. 16(A) and FIG. 16(C) with respect to a state of FIG. 16(B); the correction projection screen 66 and the projection content 25 are shifted in accordance with the hand shaking; and a trapezoidal distortion correction is performed. Specifically describing, as described above, FIG. 16(B) show a state at a hand shaking center, the correction projection screen 66, which undergoes a trapezoidal distortion correction, is set at a center of a projection screen 76 that is distorted into a trapezoidal shape, and the projection is performed in a state where a difference from the wall 5 between brightness and darkness is made small by making outside black.

FIG. 16(A) shows a state where when the projection screen 76 is deviated downward by the hand shaking to move to the state of the projection screen 13, the correction projection screen 66 and the projection content 25 are shifted in an upward direction opposite to the deviation direction to keep the projection screen 76 at the position of the projection content 25. Here it should be noted that when the projection screen 76 is deviated downward by the hand shaking to move to the state of the projection screen 13, a change is occurring in not only the deviation of the projection area but also the trapezoidal distortion state. In other words, compared with FIG. 16(B), in FIG. 16(A), the tilt comes close to a horizontal direction, and the trapezoidal distortion of the projection screen 13 becomes small. In the example 6, following this, the correction is performed such that a shrinkage degree of the long side also becomes small in the trapezoidal distortion correction of the correction projection screen 66 and projection content 25.

If a correction is not applied to the shrinkage rate of the long side and the correction projection screen 66 and the projection content 25 are simply shifted in parallel from the state of FIG. 16(B) to the state of FIG. 16(A), the shrinkage rate of the long side becomes too large in the state of FIG. 16(A), whereby a trapezoidal distortion in an opposite direction occurs in the correction projection screen 66 and the projection content 25. This trapezoidal distortion is slight, but if this is repeated by hand shaking for a short time, the correction projection screen 66 and the projection content 25 slightly repeat the deviation. In the example 6, to prevent such trouble, the correction is applied to the shrinkage rate of the long side as well as the shift of the correction projection screen 66 and projection content 25.

FIG. 16(C) shows a state where when the projection screen 76 is deviated upward by the hand shaking to move to the state of the projection screen 15, the correction projection careen 66 and the projection content 25 are shifted in a downward direction opposite to the deviation direction to keep the projection screen 76 at the position of the projection content 25. Further, in FIG. 16(C), compared with FIG. 16(B), the tilt becomes steeper and the trapezoidal distortion of the projection screen 15 becomes large; therefore, following the shift, the correction is performed such that also the shrinkage degree of the long side becomes large in the trapezoidal distortion correction of the correction projection screen 66 and projection content 25. According to this, like in the same way as FIG. 16(A), the correction projection screen 66 and the projection content 25 are prevented from being slightly deviated by the change in the trapezoidal distortion due to the hand shaking.

Figure 17:
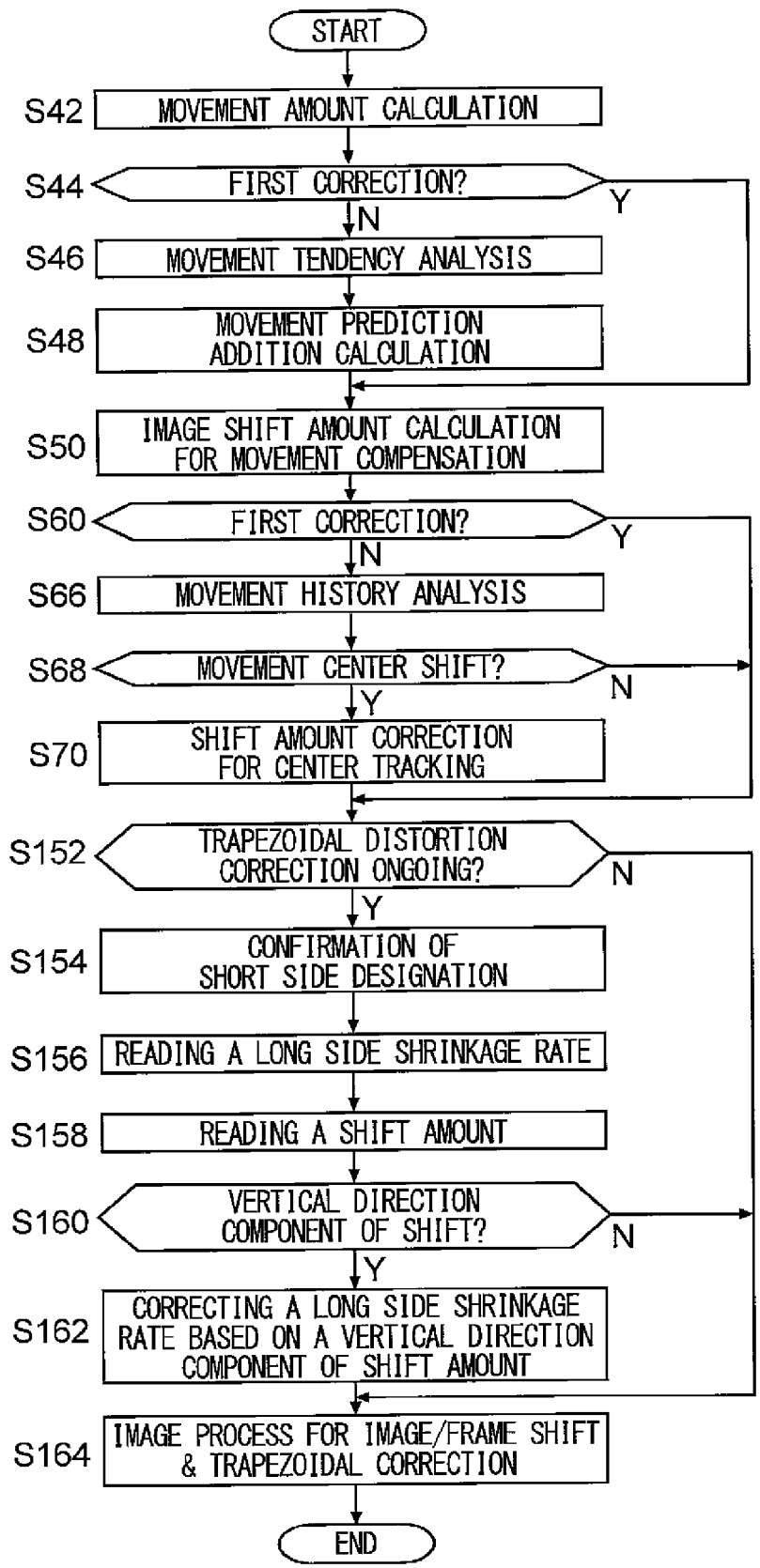
FIG. 17 is a flow chart for describing a hand shaking correction during a time of a trapezoidal distortion correction in the example 6.

FIG. 17 is a flow chart showing the hand shaking correction during the time of the trapezoidal distortion correction in the example 6. As described above, the example 6 shows an example in which a portion of the function of the example 1 is embodied, and as to the basic operation of the control portion 28 (FIG. 2 is used), the flow chart of FIG. 7 is used. Specifically describing, the flow chart of FIG. 17 replaces the steps of S28 to S32 of FIG. 7 and the other functions are common to FIG. 7. Besides, the steps of S42 to S70 of FIG. 17 are common to the flow chart of the example 3 of FIG. 12; therefore, the same step numbers are used and the description is skipped.

In FIG. 7, when the flow reaches the step S28, the flow of FIG. 17 starts and reaches the step S42. And, like in the same way as FIG. 12, when the process moves from the step S42 to the step S70, the flow goes to a step S152. In the step S152, it is checked whether a trapezoidal distortion correction is ongoing or not. And if a trapezoidal distortion correction is ongoing, the flow goes to a step S154, where it is confirmed which one of the upper side and lower side of the trapezoid is designated as the short side. Next, in a step S156, information of a shrinkage rate of the long side at the current time (state before a shift) is read. Further, in a step S158, a shift amount as a vector is read, and in a step S160, it is checked whether there is a vertical-directional component in the shift amount or not. And, if there is a vertical-directional component in the shift amount, the flow goes to a step S162 to correct the long-side shrinkage rate read in the step S156 such that a trapezoidal distortion in a state after a shift is performed based on the vertical-directional component is suitably corrected. Next, the flow goes to a step S164, where based on the shift amount calculated in the step S50 and corrected in the step S70 when necessary, the correction projection screen frame and the projection content are shifted, and the hand shaking/trapezoidal correction portion 56 is instructed to perform an image process for correcting the trapezoidal correction based on the long-side shrinkage rate that is corrected in the step S162, and the flow is ended.

On the other hand, when it is determined in the step S152 that a trapezoidal distortion correction is not ongoing, or when it is determined in the step S160 that there is not a vertical-directional component in the shift amount, the flow directly reaches a step S164. In this case, in the step S164, revision of a trapezoidal correction corresponding to the hand shaking is not performed, and based on the shift amount for the hand shaking correction that is calculated in the step S50 and corrected in the step S70 when necessary, only the shift of the correction projection screen frame and projection content is performed.

The practical use of the various features of the present invention described above is not limited to the above examples, and as long as the advantages are obtainable, various modifications are possible. For example, the structure, in which in the hand shaking correction during the trapezoidal correction described in the example 6, the correction projection screen frame and the correction content are shifted and the long-side shrinkage rate is corrected, is applicable not only to hand shaking in a vertical direction but also to hand shaking in a left-right direction by using an output from the gyroscope.

Besides, in the example 1 of FIG. 1 and the example 2 of FIG. 9, the projection contents 24, 124 are displayed as the projection contents 22, 122 on the large screen display portions 4, 104 of the mobile telephone 2, 102 with the projector, and it is possible to perform the description and operation of the projection screen 10, 110 monitoring the projection contents. But this is not limited to the case where the display on the projection screen and the display on the large screen display portion are the same. For example, it is possible to superimpose a comment and the like, which are not displayed on the projection screen, on the large screen display portion and to perform the description of the display on the projection screen watching the comment. Further, display content (e.g., display content to be displayed next) displayed on the large screen display portion may be completely different from display content displayed on projection screen.

Here, the stopping of the image process for the hand shaking correction described in the steps of S22 to S26 and the centering described in the step S36 of FIG. 7 and FIG. 11 are summed up. As described in the step S22, the image process for the hand shaking correction is stoppable by a manual operation; the manual operation is started before changing the projection place and continued during the time the mobile telephone 2 with the projector is moved, and the manual operation is removed when a new projection place is decided and the mobile telephone 2 with the projector is stopped, whereby during this time, the image process for the hand shaking process is not performed. In the meantime, as described in the step S24, also when the movement itself is not detected, it goes without saying that the image process for the hand shaking correction is not performed. Besides, as described in the step S26, it is also conceivable that when the continuous movement in the same direction is detected, the mobile telephone 2 with the projector is moved to change the projection place; therefore, the hand shaking correction is automatically stopped. And when the image process for the hand shaking correction is stopped, as described in the step S36, the centering is performed such that the correction projection screen 66 and the like come to the center of the projection screen 10, whereby when hand shaking occurs at the new projection position, an area for correction in various directions is secured. In the meantime, as described in the step S90 of FIG. 11, when the image process for the hand shaking correction is stopped, also the projection frame blurring process is not performed. Also in the panning process for a panorama image described in the step S92 of FIG. 11, the image process for the hand shaking correction is stopped in principle, but details of it are described later.

Figure 18:
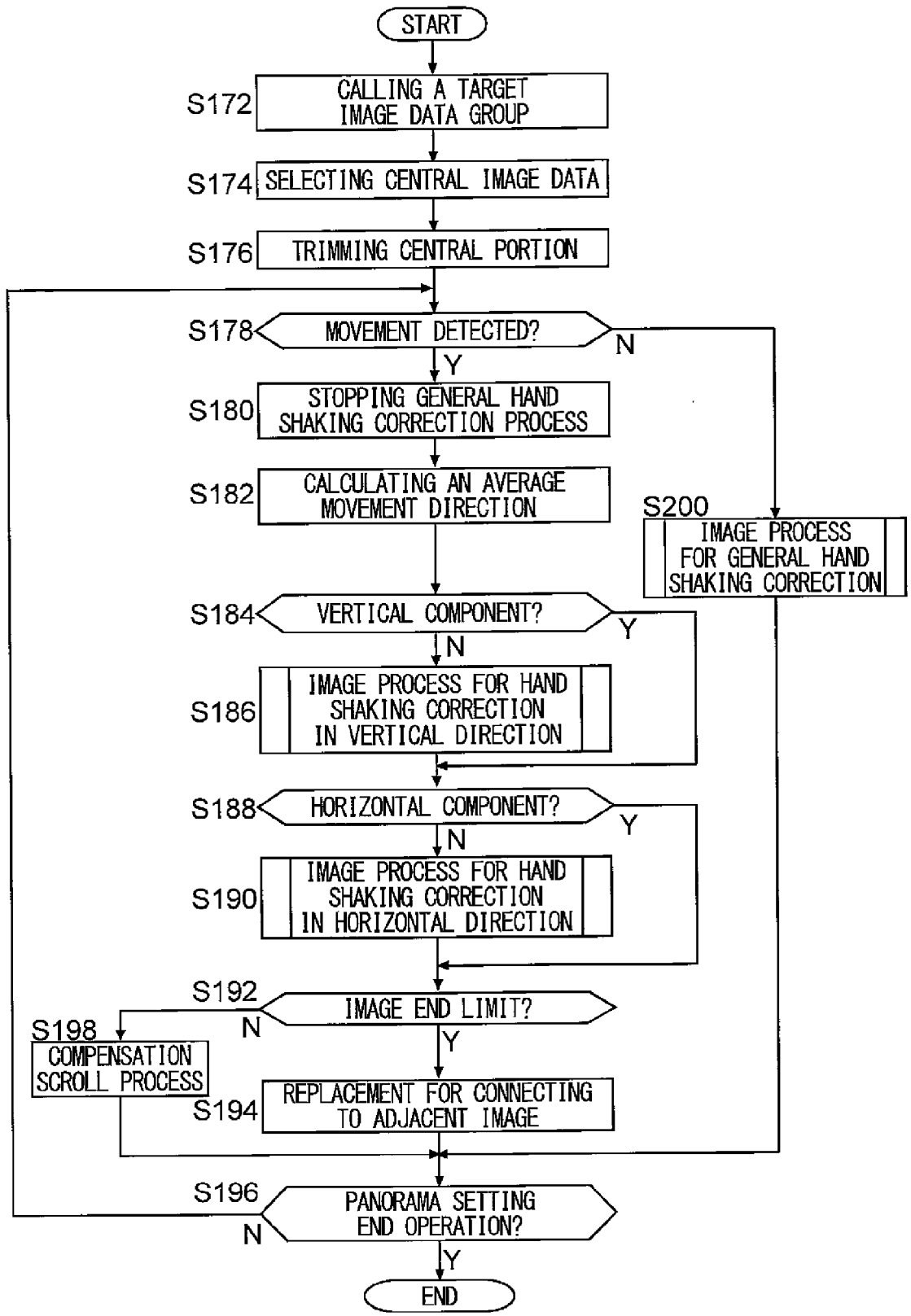
FIG. 18 is a flow chart for describing details of a panning process for a panorama image in a step S92 of a basic flow in the example 3 of the present invention shown in FIG. 11.

FIG. 18 is a flow chart for describing details of the panning process for a panorama image in the step S92 of the basic flow in the example 3 of the present invention shown in FIG. 11. As described already, the panorama setting is a setting in which projection image information for a wide area is stored in the storage portion 26; and the display data of the display memory 30 are rewritten in accordance with a movement of the mobile telephone 2 with the projector detected by the gyroscope 60 and the acceleration sensor 58. And, in the panning process for a panorama image in the step S92, in accordance with the detected data from the gyroscope 60 and acceleration sensor 58, a portion of the projection image information for a wide area stored in the storage portion 26 is trimmed to rewrite the display data of the display memory 30. According to this, if the panning is performed by moving a telescope, a portion of a scene confined in the telescope view field is shifted; likewise, the projection rendering is performed such that if the panning is performed by moving the mobile telephone 2 with the projector, a portion of a scene confined in the projection screen is shifted.

When the panning process for a panorama image shown in FIG. 18 starts, first, in a step S172, a projection data group of a projection target for a wide area is called. The projection target is generally expressed by connecting a plurality of image data to each other. Next, in a step S174, central image data of the projection target area are selected, the central portion of the image selected in a step S176 is trimmed to be the display data of the display memory 30.

Next, in a step S178, a movement of the mobile telephone 2 with the projector is detected. A detected movement includes not only a movement by the general panning operation for moving the mobile telephone 2 with the projector but also a movement by the hand shaking. And if a movement is detected, in a step S180, the general image process for a hand shaking correction is stopped. And in a step S182, an average movement direction is calculated, and in a step S184, it is checked whether the average movement direction includes a vertical-directional component or not. If the movement is occurred by the hand shaking, it is conceivable that the vertical-directional movement component is zero on average. And if the average movement direction does not include a vertical component, it is conceivable that the panning operation is performed in a horizontal direction only; therefore, the flow advances to a step S186 to perform the image process for a hand shaking correction in the vertical direction only and goes to a step S188. On the other hand, in the step S184, if a vertical component is detected in the average movement direction, it is conceivable that the panning is performed in the vertical direction; therefore, the image process for a hand shaking correction is not performed in the vertical direction, and the flow goes to the step S188.

In the step S188, it is checked whether the average movement direction includes a horizontal-directional component or not. If the movement is occurred by the hand shaking, it is conceivable that the horizontal-directional movement component is zero on average. And if there is not a horizontal component in the average movement direction, it is conceivable that the panning operation is performed in the vertical direction only; therefore, the flow advances to a step S190 to perform the image process for a hand shaking correction in the horizontal direction only and goes to a step S192. On the other hand, in the step S188, if a horizontal component is detected in the average movement direction, it is conceivable that the panning is performed in the horizontal direction; therefore, the image process for a hand shaking correction is not performed in the horizontal direction, and the flow goes to the step S192.

The panning image process is performed by means of a scroll process in one image, and upon reaching an end limit of the one image, the image data are replaced to connect to an adjacent image. For this process, in the step S192, it is checked whether the image process reaches an image end limit or not, and if it is detected that the image process reaches a limit, the flow advances to a step S194 to replace the image data to connect to the adjacent image, and goes to a step S196. On the other hand, in the step S192, if it is not detected that the image process reaches an image end limit, the flow advances to a step S198 to perform a scroll process for compensating for a movement by the panning in the same image, and goes to the step S196.

On the other hand, in the step S178, when a movement is not detected (the panning for a panorama is under suspension), the flow advances to a step S200 to perform the general image process for a hand shaking correction, and goes to the step S196. In the step S196, it is checked whether an operation for ending the panorama setting is performed or not; when the operation is not detected, the flow returns to the step S178; thereafter, as long as the operation for ending the panorama setting is not detected in the step S196, the steps of S178 to S200 are repeated. And, in the step S196, if the operation for ending the panorama setting is detected, the flow is ended and the process goes to the step S34 of FIG. 11.

Hereinafter, the various technological aspects disclosed in the present specification are summed up.
<First Technological Aspect>

According to the first technological aspect disclosed in the present specification, a projector is provided which has: an image projection portion; an image provision portion that provides a projection image to the image projection portion; a deviation movement detection portion that detects a deviation movement of the image projection portion; and an image process portion that based on detection by the deviation movement detection portion, shifts the image provided by the image provision portion in a direction where the deviation is corrected. According to this, even if the image projection function does not include a deviation correction function, it is possible to perform the deviation correction by means of the image process.

According to a specific feature, based on the detection by the deviation movement detection portion, the image process portion further corrects a projection frame for the projection image provided by the image provision portion. According to this, it becomes possible to deal with flickering of the projection image during the deviation correction as an image process.

According to a more specific feature, based on the detection by the deviation movement detection portion, the image process portion shifts the projection frame for the projection image provided by the image provision portion. According to this, it becomes possible to apply the deviation correction to both the image and the image frame.

According to another more specific feature, based on the detection by the deviation movement detection portion, the image process portion shrinks, in a projection area, the projection frame for the projection image provided by the image provision portion. According to this, a correction area for the projection frame is secured. According to a further specific feature, based on the detection by the deviation movement detection portion, the image process portion shrinks, in the shrunken projection frame, the projection image provided by the image provision portion. According to this, it becomes possible to apply the deviation correction to both the image and the image frame without losing a circumferential portion of the projection image.

According to another more specific feature, when the projection frame shrunken based on the detection by the deviation movement detection portion is not shiftable in the projection area, the image process portion decreases a shift amount of the image provided by the image provision portion. According to this, the deviation correction of the image and image frame is adjusted.

According to another specific feature of the present invention, the image process portion is structured to blur the projection frame for the projection image provided by the image provision portion. According to this, a boundary between a bright portion in the projection area and a dark portion outside the projection area becomes inconspicuous, and it becomes possible to deal with flickering of the projection image frame during the deviation correction as an image process.

According to another aspect of the present invention, a projector is provided which has: an image projection portion; an image provision portion that provides a projection image to the image projection portion; and an image process portion that blurs a projection frame for the projection image provided by the image provision portion. According to this, it becomes possible to make inconspicuous a boundary which has the largest difference between brightness and darkness and is between a bright portion in the projection area and a dark portion outside the projection area. According to a more specific feature, the projector has a deviation movement detection portion that detects a deviation movement of the image projection portion, wherein based on detection by the deviation movement detection portion, the image process portion blurs the projection frame for the projection image provided by the image provision portion. According to this, it is possible to prevent a circumferential portion of the projection image from unnecessarily becoming blurred when there is a little flickering. According to a further specific feature, based on the detection by the deviation movement detection portion, the image process portion changes a blurring amount of the projection frame for the projection image provided by the image provision portion. According to this, it becomes possible to perform a suitable blurring adjustment in accordance with the deviation.

According to another aspect, a projector is provided which has: a rectangular image display portion; an image projection portion that is disposed such that a projection optical axis meets a long-edge direction of the image display portion at right angles; and an image provision portion that provides a projection image to the image projection portion. According to this, when a horizontally long projection screen is projected, it becomes possible to display the projection image largest by means of the image display portion and monitor the projection image.

According to a more specific feature, the image projection portion is disposed at a central portion in the long-edge direction of the image display portion. According to this, when holding the projector with both hands, it becomes possible to hold the projector in a stable attitude where it is easy to operate and easy to decide a projection position.

According to another aspect of the present invention, a projector is provided which has: an image projection portion; an image provision portion that provides a projection image to the image projection portion; an attitude detection portion; and a control portion that prohibits projection performed by the image projection portion when the attitude detection portion detects an unsuitable image projection attitude. According to this, when the projection is not supposed to be performed, it is possible to prevent trouble to a surrounding area such as a start of projection of glaring projection light due to an erroneous operation and the like, which is useful, for example, for incorporating the projector into apparatuses such as a mobile telephone and the like that have originally a different function. According to a specific feature, when the attitude detection portion detects a projection attitude where a tilt of the projection image with respect to a horizontal direction is equal to or larger than a predetermined tilt, the control portion regards the projection attitude as an attitude where the projection is not supposed to be performed and prohibits the projection performed by the image projection portion. According to another specific feature, the projector is provided with a menu display portion that displays a function optional menu which includes a projection function, wherein the control portion is structured to make it disable to select the projection function from the function optional menu when the attitude detection portion detects an unsuitable projection attitude.

<Second Technological Aspect>

According to the second technological aspect disclosed in the present specification, a projector is provided which has: an image projection portion; an image provision portion that provides a projection image to the image projection portion; a deviation movement detection portion that detects a deviation movement of the image projection portion; and an image process portion that based on detection by the deviation movement detection portion, applies an image process to the image provided by the image provision portion to correct a trapezoidal distortion caused by the deviation. According to this, it is possible to prevent flickering of the image distortion due to the deviation.

According to a specific feature, when the deviation detected by the deviation movement detection portion includes a deviation component in a direction where the deviation component causes a trapezoidal distortion, the image process portion applies an image process to the image provided by the image provision portion to correct the trapezoidal distortion caused by the deviation. According to this, it is possible to perform a deviation correction adapted to a deviation factor.

According to another specific feature, based on the detection by the deviation movement detection portion, the image process portion shifts the image provided by the image provision portion in a direction where to correct the deviation. According to this, it is possible to prevent flickering due to both of a change in the image position and an image distortion caused by the deviation.

According to a more specific feature, even when the deviation detected by the deviation movement detection portion does not include a deviation component in a direction where the deviation component causes a trapezoidal distortion, the image process portion shifts the image provided by the image provision portion in a direction where to correct the deviation based on the detection by the deviation movement detection portion. According to this, it is possible to suitably deal with both of a case where there is flickering followed by the image distortion due to the deviation and a case where only the image position change due to the deviation becomes a problem.

According to another specific feature, the projector has an attitude detection portion, and the image process portion, based on detection by the attitude detection portion, changes the correction of a trapezoidal distortion caused by the deviation. According to this, it is possible to suitably correct the flickering of the trapezoidal distortion caused by the deviation in accordance with a tilt of the projector. According to a more specific feature, based on the detection by the attitude detection portion, the image process portion reverses the correction of the trapezoidal distortion caused by the deviation. According to a more specific feature, based on the detection by the attitude detection portion, the image process portion changes the long side to be shrunken in the trapezoidal distortion correction. According to this, for example, even if the projection screen changes between the wall projection and the ceiling projection and the like, it is possible to apply a suitable correction to the deviation.

According to another specific feature, based on the detection by the deviation movement detection portion, the image process portion changes the shrinkage rate of the long side in the trapezoidal distortion of the image provided by the image provision portion. According to this, it is possible to suitably prevent the flickering of the image distortion caused by the deviation.

According to another aspect, a projector is provided which has: an image projection portion; an image provision portion that provides a projection image to the image projection portion; a deviation movement detection portion that detects a deviation movement of the image projection portion; and an image process portion that based on detection by the deviation movement detection portion, shifts the image provided by the image provision portion in a direction where the deviation is corrected and performs an image process, in association with the shift, to correct a trapezoidal distortion of the image caused by the deviation. According to this, it becomes possible to perform a suitable correction to the deviation in a case where an image distortion follows a change in the image position caused by the deviation.

According to another aspect, a projector is provided which has: an image projection portion; an image provision portion that provides a projection image to the image projection portion; an attitude detection portion; an image process portion that based on detection by the attitude detection portion, performs a trapezoidal distortion correction of the image provided by the image provision portion; and a control portion that when a tilt detected by the attitude detection portion is equal to or smaller than a predetermined tilt, does not performs the trapezoidal distortion correction by means of the image process portion. According to this, even if there is a tilt somewhat, it is possible to avoid an unnecessary image process in a case where the tilt is not a problem.

According to another aspect, a projector is provided which has: an image projection portion; an image provision portion that provides a projection image to the image projection portion; a deviation movement detection portion that detects a deviation movement of the image projection portion; and an image process portion that based on detection by the deviation movement detection portion, synthesizes a compensation image with the image provided by the image provision portion. According to this, it becomes possible to deal with various deviations.

According to a specific feature, based on the detection by the deviation movement detection portion, the image process portion shifts the image provided by the image provision portion in a direction where to correct the deviation and the compensation image compensates for image information that is lost because of the shift. According to this, it is possible to deal with a case where a portion of the projection image is lost because of the deviation correction. According to a more specific feature, the compensation image is an image in which the projection frame of the projection image is blurred.

<Third Technological Aspect>

According to the third technological aspect disclosed in the present invention, a projector is provided which has: an image projection portion; an image provision portion that provides a projection image to the image projection portion; a deviation movement detection portion that detects a deviation movement of the image projection portion; an image process portion that based on detection by the deviation movement detection portion, performs a deviation correction; and a condition detection portion that detects a condition for stopping the deviation correction performed by the image process portion. According to this, it is possible to avoid a wasteful image process.

According to a specific feature, the projector has a manual operation portion, and the condition detection portion employs an operation on the manual operation portion as a condition for stopping the deviation correction. According to this, for example, in a case where the projector is moved to change the projection position and the like, it is possible to intentionally avoid a wasteful deviation correction during a time the projection position change is ongoing.

According to another specific feature, the projector has a movement detection portion that detects a movement of the projector itself, and the condition detection portion employs a continuous movement of the projector in the same direction detected by the movement detection portion as a condition for stopping the deviation correction. According to this, for example, when the projector is moved to change the projection position, or when the panning for a panorama image is performed, it is possible to automatically avoid a wasteful deviation correction during the time the projection position change is ongoing.

According to a more specific feature, when a movement-directional component of the projector is detected by the movement detection portion and there is not an average movement-directional component, even if there is a deviation correction stop condition, the deviation correction is performed by the image process portion in the direction. According to this, for example, in a case where the panning for a panorama image is performed and the like, it becomes possible to correct hand shaking in a direction other than the panning direction.

According to another specific feature, when the condition detection portion detects a condition for stopping the deviation correction, the centering of the deviation correction image is performed. According to this, it is possible to secure a correction area in various directions when the deviation correction is resumed.

According to a still another specific feature, the projector has a projection frame blurring process portion that performs a projection frame blurring process due to the image process for a deviation correction, and when the condition detection portion detects a condition for stopping the deviation correction, the projector stops the process performed by the projection frame blurring process portion. According to this, it is possible to stop both the deviation correction process and the projection frame blurring process when necessary.

According to another aspect, a projector is provided which has: an image projection portion; an image provision portion that provides a projection image to the image projection portion; a deviation movement detection portion that detects a deviation movement of the image projection portion; an image process portion that based on detection by the deviation movement detection portion, performs a deviation correction; and a condition detection portion that detects a condition for performing the centering of a deviation correction image. According to this, it is possible to secure a deviation correction area in various directions when necessary.

According to a specific feature, the condition detection portion employs the stopping of the image process for a deviation correction as a condition for the centering. According to this, it is possible to secure a correction area in various directions when the deviation correction is resumed.

According to another specific feature, the condition detection portion employs a continuous movement of the projector in the same direction as a condition for the centering. According to this, it is possible to secure a correction area in various directions after the continuous movement of the projector in the same direction ends.

According to another aspect, a projector is provided which has: an image projection portion; an image provision portion that provides a projection image to the image projection portion; a deviation movement detection portion that detects a deviation movement of the image projection portion; and an image process portion that based on detection by the deviation movement detection portion, performs a deviation correction, wherein when the deviation movement detection portion detects a movement-directional component of the projector and an average movement-directional component is continuously in the same direction, the image process portion stops a deviation image correction in the direction. According to this, it is possible to stop a wasteful correction in the same direction where the average movement-directional component is continuous and to perform a correction in other directions when necessary.

According to a specific feature, the projector has a panning process means for a panorama image, and the stopping of the deviation correction is performed during a time a panning process for a panorama image is ongoing.

INDUSTRIAL APPLICABILITY

The present invention is applicable to a stand-alone mobile projector or mobile apparatuses incorporating a projector such as, a mobile telephone, a mobile music player and the like.

REFERENCE SIGNS LIST

8 image projection portion
30 image provision portion
58, 60 deviation movement detection portion
4, 104 image display portion
58 attitude detection portion
28 control portion, condition detection portion
4, 104 menu display portion
42 image process portion
3 manual operation portion

The invention claimed is:

1. A projector for projecting an image onto a projection plane comprising:
   an image projection portion arranged to project the image onto the projection plane, the image projection portion being operable to move relative to the projection plane to deviate the image on the projection plane;
   an image data provision portion arranged to provide a projection image data to the image projection portion; and
   an image process portion arranged to modify the projection image data provided by the image data provision portion to blur a boundary of a frame of the image projected on the projection plane to make flickering of the boundary, that would otherwise be caused due to the movement of the image projection portion relative to the projection plane, inconspicuous.

2. The projector according to claim 1, further comprising:
   a deviation movement detection portion arranged to detect a deviation movement of the image projection portion relative to the projection plane, wherein
   based on detection by the deviation movement detection portion, the image process portion is arranged to modify the projection image data provided by the image data provision portion to blur a boundary of a frame of the image projected on the projection plane.

3. The projector according to claim 2, wherein
   based on the detection by the deviation movement detection portion, the image process portion is arranged to modify the projection image data provided by the image data provision portion to change a blurring amount of the boundary of the frame of the image projected on the projection plane.

* * * * *